US009638430B2

(12) United States Patent
Motomura et al.

(10) Patent No.: US 9,638,430 B2
(45) Date of Patent: May 2, 2017

(54) AIR-CONDITIONING APPARATUS

(71) Applicants: Yuji Motomura, Tokyo (JP); Daisuke Shimamoto, Tokyo (JP); Takayoshi Honda, Tokyo (JP); Osamu Morimoto, Tokyo (JP); Koji Nishioka, Tokyo (JP); Tatsuo Ono, Tokyo (JP)

(72) Inventors: Yuji Motomura, Tokyo (JP); Daisuke Shimamoto, Tokyo (JP); Takayoshi Honda, Tokyo (JP); Osamu Morimoto, Tokyo (JP); Koji Nishioka, Tokyo (JP); Tatsuo Ono, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/443,205

(22) PCT Filed: Nov. 30, 2012

(86) PCT No.: PCT/JP2012/081071
§ 371 (c)(1),
(2) Date: May 15, 2015

(87) PCT Pub. No.: WO2014/083680
PCT Pub. Date: Jun. 5, 2014

(65) Prior Publication Data
US 2015/0285519 A1    Oct. 8, 2015

(51) Int. Cl.
*F24F 5/00* (2006.01)
*F25B 13/00* (2006.01)
(Continued)

(52) U.S. Cl.
CPC .............. *F24F 5/001* (2013.01); *F25B 13/00* (2013.01); *F25B 25/005* (2013.01); *F24F 3/065* (2013.01);
(Continued)

(58) Field of Classification Search
CPC .. F25B 13/00; F25B 25/005; F25B 2313/023; F25B 2313/0272; F25B 2600/13;
(Continued)

(56) References Cited

U.S. PATENT DOCUMENTS 8,752,397 B2 *   6/2014   Yamashita ................ F24F 3/06
                                                        62/151
8,844,302 B2 *   9/2014   Takata ..................... F25B 13/00
                                                        62/127
(Continued)

FOREIGN PATENT DOCUMENTS

CN          102575880 A     7/2012
EP          2 492 611 A1    8/2012
(Continued)

OTHER PUBLICATIONS

International Search Report of the International Searching Authority mailed Mar. 5, 2013 for the corresponding international application No. PCT/JP2012/081071 (and English translation).
(Continued)

*Primary Examiner* — Mohammad M Ali
(74) *Attorney, Agent, or Firm* — Posz Law Group, PLC

(57) ABSTRACT

In an air-conditioning apparatus, when a plurality of pumps are all operating and a heat exchange amount in use-side heat exchangers is equal to or lower than a lower limit of a thermal capacity that can be conveyed in a heat medium circuit B, before at least one of the plurality of pumps is stopped, a refrigerant flow path in the intermediate heat exchanger connected to the pump that is to be stopped is closed. Then, the at least one of the plurality of pumps is stopped, and the thermal capacity required in at least one of the use-side heat exchangers in the rest of the plurality of pumps is conveyed.

9 Claims, 12 Drawing Sheets

(51) Int. Cl.
*F25B 25/00* (2006.01)
*F24F 3/06* (2006.01)

(52) U.S. Cl.
CPC . *F25B 2313/023* (2013.01); *F25B 2313/0272* (2013.01); *F25B 2313/02743* (2013.01); *F25B 2600/13* (2013.01); *Y02B 30/745* (2013.01)

(58) Field of Classification Search
CPC . F25B 2313/02743; F24F 5/001; F24F 3/065; Y02B 30/745
USPC ........................................................ 62/324.1
See application file for complete search history.

(56) References Cited

U.S. PATENT DOCUMENTS

| | | | | |
|---|---|---|---|---|
| 8,863,545 B2* | 10/2014 | Fujimoto | ............... | F25B 1/10 236/12.1 |
| 8,943,849 B2* | 2/2015 | Takata | ............... | F24F 3/06 62/115 |
| 9,212,825 B2* | 12/2015 | Wakamoto | ............... | F24F 3/06 |
| 9,273,875 B2* | 3/2016 | Yamashita | ............... | F24F 3/06 |
| 9,366,452 B2* | 6/2016 | Takenaka | ............... | F24F 3/06 |
| 2011/0030409 A1* | 2/2011 | Fujimoto | ............... | F25B 1/10 62/324.6 |
| 2011/0048055 A1* | 3/2011 | Fujimoto | ............... | F25B 1/10 62/324.6 |
| 2011/0088421 A1* | 4/2011 | Wakamoto | ............... | F25B 13/00 62/238.7 |
| 2011/0113802 A1* | 5/2011 | Wakamoto | ............... | F24F 3/06 62/196.1 |
| 2011/0167865 A1* | 7/2011 | Morimoto | ............... | F24F 3/06 62/513 |
| 2011/0174002 A1* | 7/2011 | Jang | ............... | F25B 13/00 62/115 |
| 2011/0192189 A1* | 8/2011 | Morimoto | ............... | F24F 3/06 62/513 |
| 2012/0118530 A1* | 5/2012 | Yamashita | ............... | F24F 3/06 165/58 |
| 2012/0151949 A1* | 6/2012 | Yamashita | ............... | F24F 3/06 62/160 |
| 2012/0180515 A1 | 7/2012 | Morimoto et al. | | |
| 2012/0198873 A1* | 8/2012 | Yamashita | ............... | F24F 3/065 62/160 |
| 2012/0198874 A1* | 8/2012 | Yamashita | ............... | F24F 3/06 62/160 |
| 2012/0198879 A1* | 8/2012 | Motomura | ............... | F25B 13/00 62/238.7 |
| 2012/0204585 A1* | 8/2012 | Yamashita | ............... | F25B 13/00 62/160 |
| 2012/0234032 A1* | 9/2012 | Yamashita | ............... | F25B 13/00 62/160 |
| 2012/0292006 A1* | 11/2012 | Yamashita | ............... | F24F 3/06 165/200 |
| 2012/0297803 A1* | 11/2012 | Yamashita | ............... | F25B 13/00 62/203 |
| 2012/0297804 A1* | 11/2012 | Yamashita | ............... | F25B 25/005 62/207 |
| 2012/0304681 A1* | 12/2012 | Morimoto | ............... | F25B 13/00 62/324.6 |
| 2012/0324932 A1* | 12/2012 | Morimoto | ............... | F25B 13/00 62/157 |
| 2013/0061623 A1* | 3/2013 | Yamashita | ............... | F25B 13/00 62/238.7 |

FOREIGN PATENT DOCUMENTS

| | | |
|---|---|---|
| JP | 05-280818 A | 10/1993 |
| JP | 2001-289465 A | 10/2001 |
| JP | 2003-343936 A | 12/2003 |
| JP | 2005-140444 A | 6/2005 |
| JP | 2007-024325 A | 2/2007 |
| WO | 2010/049998 A1 | 5/2010 |
| WO | 2011/114368 A1 | 9/2011 |

OTHER PUBLICATIONS

Extended European Search Report dated Jul. 14, 2016 issued in corresponding EP patent application No. 12889319.5.
Office Action mailed Nov. 28, 2016 issued in corresponding CN patent application No. 2012800773846 (and English translation).

* cited by examiner

F I G. 6
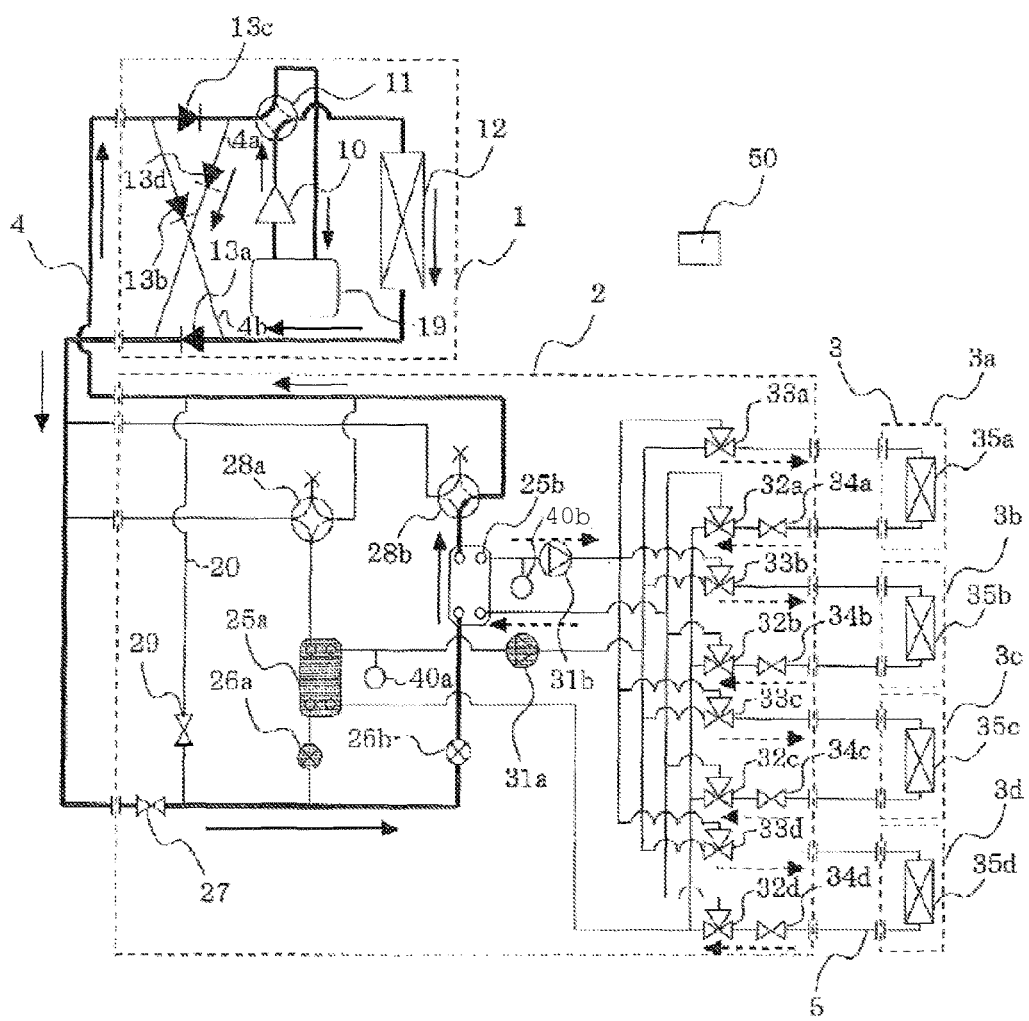

FIG. 12

| OPERATION MODE | ACTION NO. | PUMP 31 | BEFORE CHANGE | AFTER CHANGE | ACTION (1) | ACTION (2) | ACTION (3) |
|---|---|---|---|---|---|---|---|
| COOLING ONLY OPERATION MODE | (1) | 31a | ON | OFF | SWITCH 28a | CLOSE 26a | STOP 31a |
| | | 31b | ON | ON | | | |
| | (2) | 31a | ON | ON | SWITCH 28b | CLOSE 26b | STOP 31b |
| | | 31b | ON | OFF | | | |
| | (3) | 31a | OFF | ON | DRIVE 31a/31b AT LOW SPEEDS | RELEASE CLOSING OF 26a | SWITCH 28a |
| | | 31b | ON | ON | | | |
| | (4) | 31a | ON | ON | DRIVE 31a/31b AT LOW SPEEDS | RELEASE CLOSING OF 26b | SWITCH 28b |
| | | 31b | OFF | ON | | | |
| HEATING ONLY OPERATION MODE | (5) | 31a | ON | OFF | CLOSE 26a | STOP 31a | SWITCH 32/33 (TOWARD 25b) |
| | | 31b | ON | ON | | | |
| | (6) | 31a | ON | ON | CLOSE 26b | STOP 31b | SWITCH 32/33 (TOWARD 25a) |
| | | 31b | ON | OFF | | | |
| | (7) | 31a | OFF | ON | SWITCH 32/33 (BOTH SIDES) | DRIVE 31a/31b AT LOW SPEEDS | RELEASE CLOSING OF 26a |
| | | 31b | ON | ON | | | |
| | (8) | 31a | ON | ON | SWITCH 32/33 (BOTH SIDES) | DRIVE 31a/31b AT LOW SPEEDS | RELEASE CLOSING OF 26b |
| | | 31b | OFF | ON | | | |

FIG. 13

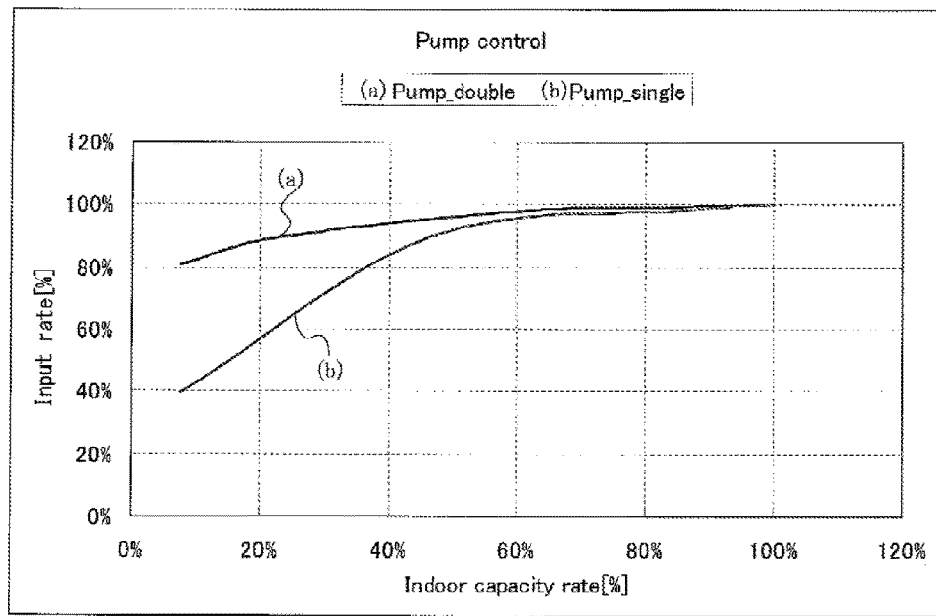

AIR-CONDITIONING APPARATUS

CROSS REFERENCE TO RELATED APPLICATION

This application is a U.S. national stage application of International Application No. PCT/JP2012/081071 filed on Nov. 30, 2012, the disclosure of which is incorporated by reference.

TECHNICAL FIELD

The present invention relates to an air-conditioning apparatus applied to, for example, a multi-air-conditioning apparatus for a building.

BACKGROUND ART

A known air-conditioning apparatus such as a multi-air-conditioning apparatus for a building causes a refrigerant to circulate between an outdoor unit being a heat source device arranged, for example, outside a structure and an indoor unit arranged inside a room in the structure. The refrigerant rejects heat or removes heat to heat or cool air, and the air makes air-conditioned space cooled or heated. One example frequently used as such a refrigerant may be a hydrofluorocarbon (HFC) refrigerant. An example that uses a natural refrigerant, such as carbon dioxide ($CO_2$), has also been proposed.

In an air-conditioning apparatus called a chiller, a heat source device arranged outside a structure generates cooling energy or heating energy. A heat exchanger arranged inside an outdoor unit heats or cools water, antifreeze, or the like, it is conveyed to a fan coil unit, panel heater, or the like, which is an indoor unit, and cooing or heating is performed (see, for example, Patent Literature 1).

There is also an air-conditioning apparatus called a waste heat recovery chiller in which a heat source device and an indoor unit are connected by four water pipes, cooled water and heated water and the like can be simultaneously supplied to allow cooling or heating to be freely selected in the indoor unit (see, for example, Patent Literature 2).

There is also an air-conditioning apparatus in which a heat exchanger for a primary refrigerant and a secondary refrigerant is arranged in the vicinity of each indoor unit and the secondary refrigerant is conveyed to the indoor unit (see, for example, Patent Literature 3).

There is also an air-conditioning apparatus in which an outdoor unit and a branch unit having a heat exchanger are connected by two pipes and a secondary refrigerant is conveyed to an indoor unit (see, for example, Patent Literature 4).

One existing air-conditioning apparatus such as a multi-air-conditioning apparatus for a building is the one in which a refrigerant is circulated from an outdoor unit to a relay unit, a heat medium, such as water, is circulated from the relay unit to an indoor unit, and thus power for conveying the heat medium is reduced while the heat medium, such as water, is circulated to the indoor unit (see, for example, Patent Literature 5).

CITATION LIST

Patent Literature

Patent Literature 1: Japanese Unexamined Patent Application Publication No. 2005-140444 (p. 4, FIG. 1, and the like)

Patent Literature 2: Japanese Unexamined Patent Application Publication No. 5-280818 (pp. 4, 5, FIG. 1, and the like)

Patent Literature 3: Japanese Unexamined Patent Application Publication No. 2001-289465 (pp. 5-8, FIGS. 1, 2, and the like)

Patent Literature 4: Japanese Unexamined Patent Application Publication No. 2003-343936 (p. 5, FIG. 1)

Patent Literature 5: International Publication No. WO 10/049998 (p. 3, FIG. 1, and the like)

SUMMARY OF INVENTION

Technical Problem

In a known air-conditioning apparatus, such as a multi-air-conditioning apparatus for a building, because the refrigerant is circulated to the indoor unit, the refrigerant may leak into the room and the like. In contrast, in the air-conditioning apparatuses described in Patent Literatures 1 and 2, the refrigerant does not pass through the indoor unit. However, the air-conditioning apparatuses described in Patent Literatures 1 and 2 needs the heat source device outside the structure to heat or cool the heat medium and convey it toward the indoor unit. This results in an increases path along which the heat medium circulates. To convey heat for performing work of predetermined heating or cooling using the heat medium, the amount of energy consumed by conveying power and the like is larger than that when the refrigerant is used. Thus the increased circulation path leads to significantly increased conveying power. This indicates that energy savings in the air-conditioning apparatus can be achieved by effective control of the circulation of the heat medium.

In the air-conditioning apparatus described in Patent Literature 2, it is necessary to connect the outdoor side and the inside of a room using the four pipes to allow cooling or heating to be selected for each indoor unit. This makes construction difficult. In the air-conditioning apparatus described in Patent Literature 3, it is necessary to have means for circulating a secondary refrigerant, such as a pump, for each indoor unit. This makes the system expensive and also increases noise, and the air-conditioning apparatus is not practical. In addition, because the heat exchanger is in the vicinity of the indoor unit, there remains the possibility that the refrigerant leaks at a location near the inside of a room.

In the air-conditioning apparatus described in Patent Literature 4, because a primary refrigerant after heat exchange enters the same flow as that for a primary refrigerant before the heat exchange, when a plurality of indoor units are connected, it is difficult to achieve the highest performance in each indoor unit, and in terms of energy, its configuration is wasteful. Additionally, because the branch unit and an extended pipe are connected by a total of four pipes of two pipes for cooling and two pipes for heating, the configuration is thus similar to that in a system in which an outdoor unit and a branch unit are connected by four pipes, and constructing the system is difficult.

In the air-conditioning apparatus described in Patent Literature 5, there is no problem when a single refrigerant or near-azeotropic refrigerant mixture is used as the refrigerant. However, in the case where a zeotropic refrigerant mixture is used as the refrigerant, when a refrigerant-heat medium heat exchanger is used as an evaporator, a temperature glide between a saturated liquid temperature and a saturated gas temperature of the refrigerant may cause the heat medium, such as water, to freeze.

In the air-conditioning apparatus described in Patent Literature 5, when the heat medium is heated by the refrigerant, the heated heat medium is conveyed using heat-medium conveying means to an indoor unit that is to perform heating operation from among connected indoor units. When the heat medium is cooled by the refrigerant, the cooled heat medium is conveyed using the heat-medium conveying means to an indoor unit that is to perform cooling operation from among the connected indoor units. Thus to perform the cooling operation or heating operation using such a refrigerant and heat medium, the heat-medium conveying device is necessary as cooling thermal capacity conveying means and heating thermal capacity conveying means, and the action of the heat-medium conveying device enables the cooling operation or heating operation to continue.

In the air-conditioning apparatus described in Patent Literature 5, when the load in the connected indoor units is sufficiently small, the heated or cooled heat medium is also continuously conveyed using the heat-medium conveying means. Thus the heat medium may be conveyed at a flow rate more than necessary may be conveyed to a connected indoor units.

As a result of conveying the heat medium more than necessary to the connected indoor units, the flow speed of the heat medium flowing through the connection pipe or inside the indoor units may exceed and remain in a flow speed at which an oxide film formed inside the pipes is separated. This may cause pitting corrosion in the pipe.

In other cases, as a result of conveying the heat medium more than necessary to the connected indoor units, a driving power by the heat-medium conveying device larger than estimated is consumed, and this may result in an excessive power consumption of the system.

Therefore, when the load in the connected indoor units in the air-conditioning apparatus is sufficiently small, with control of stopping one of the plurality of heat-medium conveying devices and enabling cooling operation or heating operation to continue by another heat-medium conveying device, the risk of pitting corrosion in the pipes caused by an increase in the flow speed in the air-conditioning apparatus can be reduced and energy savings achieved by a reduction in the number of heat-medium conveying devices can also be maintained.

The present invention is made to solve the above-described issues. It is an object of the present invention to provide an air-conditioning apparatus including a plurality of heat-medium conveying devices and capable of improving energy savings and safety by control of the plurality of heat-medium conveying devices even when the load in indoor units is sufficiently small in a single operation mode.

Solution to Problem

An air-conditioning apparatus according to the present invention includes a refrigerant circuit in which a compressor, a heat-source-side heat exchanger, a plurality of expansion devices, refrigerant flow paths in a plurality of intermediate heat exchangers, and a plurality of refrigerant flow switching devices each configured to switch a refrigerant circulation path are connected by a refrigerant pipe, the refrigerant circuit being configured to allow a heat-source-side refrigerant to circulate therethrough and a heat medium circuit in which a plurality of heat-medium conveying devices disposed corresponding to the plurality of intermediate heat exchangers, a plurality of use-side heat exchangers, and heat-medium flow paths in the plurality of intermediate heat exchangers are connected by a heat-medium conveying pipe, the heat medium circuit being configured to allow a heat medium to circulates therethrough. The heat-source-side refrigerant and the heat medium exchange heat with each other in the intermediate heat exchangers. When all of the plurality of heat-medium conveying devices are operating and a heat exchange amount in the use-side heat exchangers is equal to or lower than a lower limit of a thermal capacity that can be conveyed in the heat medium circuit, before at least one of the plurality of heat-medium conveying devices is stopped, the refrigerant flow path in the intermediate heat exchanger connected to the heat-medium conveying device that is to be stopped is closed, then the at least one of the plurality of heat-medium conveying devices is stopped, and a thermal capacity required in at least one of the use-side heat exchangers is conveyed by the rest of the plurality of heat-medium conveying devices.

Advantageous Effects of Invention

With the air-conditioning apparatus according to the present invention, when the load in the connected indoor units is sufficiently small, the power of driving the heat-medium conveying devices can be reduced by stopping at least one of the heat-medium conveying devices. This can avoid an excessive flow rate of the conveyed heat medium arising from the heat medium conveyance by the plurality of heat-medium conveying devices. As a result, the risk of pitting corrosion in pipes caused by an increase in flow rate of the heat medium can be avoided, and energy savings and safety can be improved.

BRIEF DESCRIPTION OF DRAWINGS

FIG. 6 is a refrigerant circuit diagram that illustrates the stream of the refrigerant and a stream of a heat medium when one pump is inactivated in cooling only operation mode in the air-conditioning apparatus according to Embodiment of the present invention.

FIG. 12 is a table that illustrates actions of a refrigerant circuit and a heat medium circuit when one pump is inactive in the case where a load in connected indoor units is small in each operation mode in the air-conditioning apparatus according to Embodiment of the present invention.

FIG. 13 is a graph that illustrates comparison between a change in driving power when the flow rate decreases using two pumps and a change in driving power when the flow rate decreases using one pump in the case where the load in the connected indoor units is small.

DESCRIPTION OF EMBODIMENTS

Embodiment of the present invention is described below on the basis of the drawings.

Figure 1:
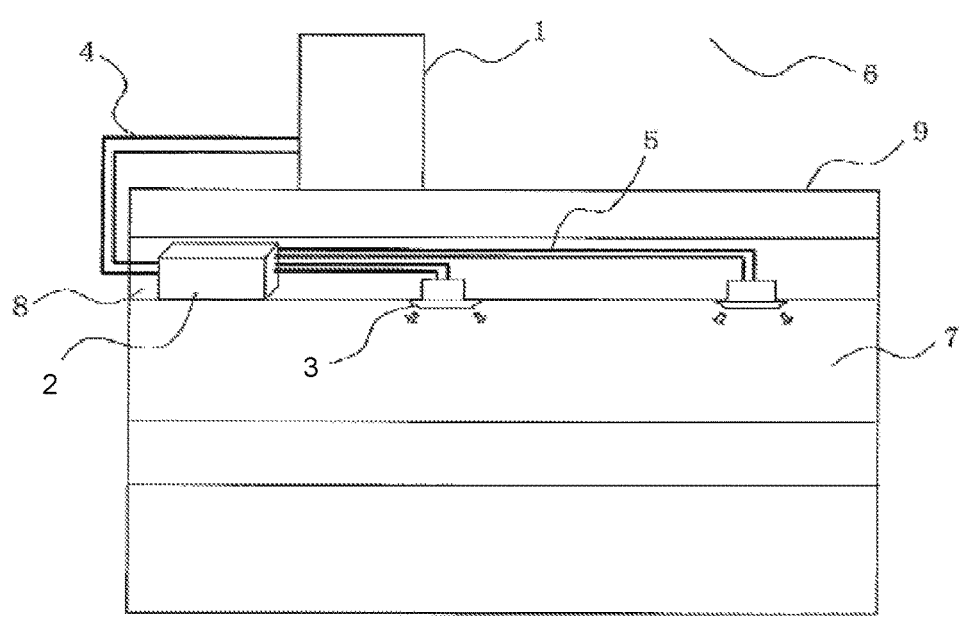
FIG. 1 is a schematic diagram that illustrates an example of placement of an air-conditioning apparatus according to Embodiment of the present invention.

FIG. 1 is a schematic diagram that illustrates an example of placement of an air-conditioning apparatus according to Embodiment of the present invention. The example of placement of the air-conditioning apparatus is described on the basis of FIG. 1. The air-conditioning apparatus allows each indoor unit to freely select cooling mode or heating mode as operation mode by using refrigeration cycles (refrigerant circuit A and heat medium circuit B) for circulating refrigerants (heat-source-side refrigerant and heat medium). FIG. 1 schematically illustrates in general the air-conditioning apparatus in which a plurality of indoor units 3 are connected. The relationships among the sizes of components in the drawings described below, which include FIG. 1, may differ from the real ones.

In FIG. 1, the air-conditioning apparatus according to Embodiment includes an outdoor unit (heat source device) 1, the plurality of indoor units 3, and a single relay unit 2 disposed between the outdoor unit 1 and the indoor units 3. The relay unit 2 is configured to cause the heat-source-side refrigerant and the heat medium to exchange heat with each other. The outdoor unit 1 and the relay unit 2 are connected by refrigerant pipes 4 allowing the heat-source-side refrigerant to travel therethrough. The relay unit 2 and the indoor units 3 are connected by pipes (heat medium pipes) 5 allowing the heat medium to travel therethrough. Cooling energy or heating energy generated by the outdoor unit 1 is delivered to the indoor units 3 through the relay unit 2.

The outdoor unit 1 is typically arranged in outdoor space 6, which is space outside a structure 9 of, for example, a building (e.g., on the roof) and is configured to supply cooling energy or heating energy to the indoor units 3 through the relay unit 2. Each of the indoor units 3 is arranged in a location at which it can supply air for cooling or air for heating to indoor space 7, which is space inside the structure 9 (e.g., a living room), and is configured to supply the air for cooling or the air for heating to the indoor space 7, which is an air-conditioned space. The relay unit 2 is configured as a housing different from the outdoor unit 1 and the indoor unit 3, can be disposed in a location different from the outdoor space 6 and the indoor space 7, is connected to the outdoor unit 1 and the indoor unit 3 by the refrigerant pipes 4 and the pipes 5, respectively, and is configured to transmit the cooling energy or heating energy supplied from the outdoor unit 1, to the indoor unit 3.

Actions of the air-conditioning apparatus according to Embodiment of the present invention are briefly described.

The heat-source-side refrigerant is conveyed from the outdoor unit 1 to the relay unit 2 through the refrigerant pipe 4. The conveyed heat-source-side refrigerant exchanges heat with the heat medium in an intermediate heat exchanger (intermediate heat exchanger 25, which is described below) inside the relay unit 2 and heats or cools the heat medium. That is, warm water or cold water is generated in the intermediate heat exchanger. The warm water or cold water generated in the relay unit 2 is conveyed to the indoor unit 3 through the pipe 5 by a heat-medium conveying device (pump 31, which is described below) and it is provided, in the indoor unit 3, to heating operation (merely requiring an operation state that needs warm water) or cooling operation (merely requiring an operation state that needs cold water) for the indoor space 7.

Examples of the heat-source-side refrigerant may include a single refrigerant, such as R-22, R-134a, or R-32, a near-azeotropic refrigerant mixture, such as R-410A or R-404A, a zeotropic refrigerant mixture, such as R-407C, a refrigerant that includes a double bond in its chemical formula and that has a relatively small global warming potential value, such as $CF_3CF=CH_2$, a mixture thereof, and a natural refrigerant, such as $CO_2$ or propane.

Examples of the heat medium may include water, antifreeze, a liquid mixture of water and antifreeze, and a liquid mixture of water and an additive having high anti-corrosive properties.

As illustrated in FIG. 1, in the air-conditioning apparatus according to Embodiment, the outdoor unit 1 and the relay unit 2 are connected by the two refrigerant pipes 4, and the relay unit 2 and each of the indoor units 3 are connected by the two pipes 5. In the air-conditioning apparatus according to Embodiment, the units (outdoor unit 1, indoor units 3, and relay unit 2) are connected using two pipes (refrigerant pipes 4 and pipes 5), and thus the execution of construction work is easy.

FIG. 1 illustrates, as an example, the state in which the relay unit 2 is disposed in space that is inside the structure 9 but different from the indoor space 7, such as space above a ceiling, (hereinafter referred to simply as space 8). Accordingly, the relay unit 2 may also be disposed in a location that is even other than the space above the ceiling, the location is any location that is other than a living space and where air is allowed to pass between the location and the outside. One example of such a location may be a common space, such as the one in which an elevator is present, where air is allowed to pass between the location and the outside. The relay unit 2 may also be disposed in the vicinity of the outdoor unit 1. It is noted, however, that if the distance between the relay unit 2 and the indoor unit 3 is too long, the power of conveying the heat medium is significantly increased and thus the advantage of energy savings is reduced.

FIG. 1 illustrates the case where the outdoor unit 1 is disposed in the outdoor space 6, as an example. Other cases are also applicable. For example, the outdoor unit 1 may be disposed in an enclosed space with a vent, such as a machine room, may also be disposed inside the structure 9 if waste heat can be ejected to the outside of the structure 9 through an exhaust duct, or may also be disposed inside the structure 9 when the outdoor unit 1 is a water-cooled one. Even when the outdoor unit 1 is disposed in such locations, no particular problem occurs.

FIG. 1 illustrates the case where the indoor unit 3 is of the ceiling cassette type as an example. Other cases are also applicable. For example, it may be of any type that can blow air for heating or air for cooling into the indoor space 7 directly or using a duct or the like, such as the ceiling concealed type or ceiling suspended type.

The numbers of connected outdoor units 1, indoor units 3, and relay units 2 are not limited to those illustrated in FIG. 1 and can be selected in accordance with the structure 9 where the air-conditioning apparatus according to Embodiment is disposed.

When a plurality of relay units 2 are connected to a single outdoor unit 1, the plurality of relay units 2 may be interspersed in a common space in a structure of, for example, a building or another space, such as space above a ceiling. This enables the intermediate heat exchangers in the relay units 2 to produce the air-conditioning load. The indoor units 3 may be disposed at a distance or height within a conveying allowance range of the intermediate heat exchangers in the relay units 2 and can be arranged throughout a structure of, for example, a building.

Figure 2:
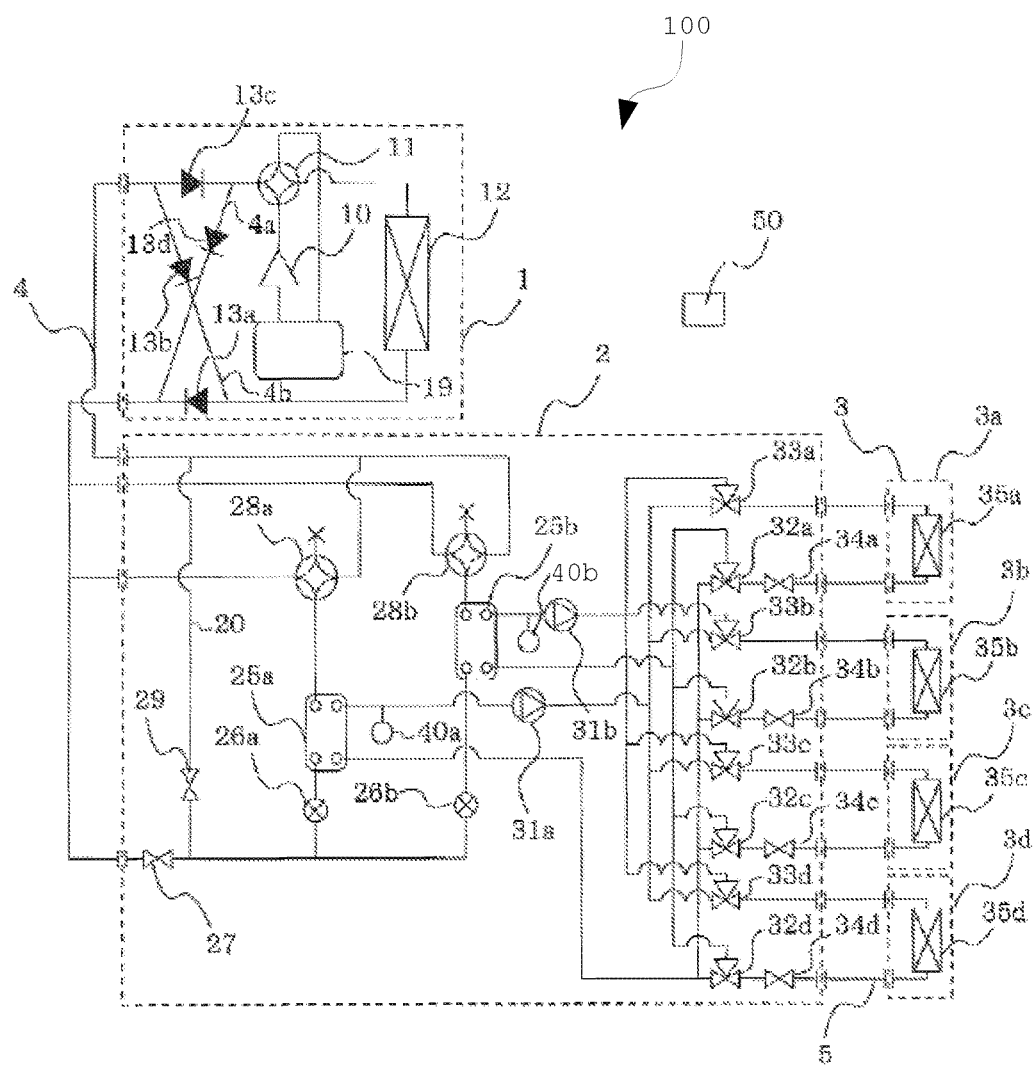
FIG. 2 is a schematic diagram that illustrates an example of a circuit configuration of the air-conditioning apparatus according to Embodiment of the present invention.

FIG. 2 is a schematic diagram that illustrates an example of a circuit configuration of the air-conditioning apparatus according to Embodiment (hereinafter referred to as air-conditioning apparatus 100). The configuration of the air-conditioning apparatus 100, that is, the workings of each actuator included in the refrigerant circuits are described in detail on the basis of FIG. 2. As illustrated in FIG. 2, the outdoor unit 1 and the relay unit 2 are connected by the refrigerant pipes 4 through an intermediate heat exchanger (refrigerant-water heat exchanger) 25a and an intermediate heat exchanger (refrigerant-water heat exchanger) 25b included in the relay unit 2. The relay unit 2 and the indoor units 3 are connected by the pipes 5 through the intermediate heat exchangers 25a and 25b. The refrigerant pipes 4 and the pipes 5 are described in a later part.

[Outdoor Unit 1]

The outdoor unit 1 incorporates a compressor 10, a first refrigerant flow switching device 11, such as a four-way valve, a heat-source-side heat exchanger 12, and an accumulator 19, and these components are connected in series by the refrigerant pipes 4. The outdoor unit 1 includes a refrigerant connection pipe 4a, a refrigerant connection pipe 4b, a check valve 13a, a check valve 13b, a check valve 13c, and a check valve 13d. The inclusion of the refrigerant connection pipes 4a and 4b and check valves 13a to 13d enables the stream of the heat-source-side refrigerant toward the relay unit 2 to flow in a certain direction for any operation requested by the indoor unit 3.

The compressor 10 is configured to suck the heat-source-side refrigerant, compress it to a high-temperature and high-pressure state, and convey it to the refrigerant circuit A. One example of the compressor 10 may be an inverter compressor whose capacity is controllable. The first refrigerant flow switching device 11 is configured to switch the stream of the heat-source-side refrigerant in heating operation (heating only operation mode and heating main operation mode) and the stream of the heat-source-side refrigerant in cooling operation (cooling only operation mode and cooling main operation mode).

The heat-source-side heat exchanger 12 functions as an evaporator in heating operation and functions as a condenser (or radiator) in cooling operation and is configured to cause fluid, such as air, supplied from an air-sending device, such as a fan, which is not illustrated, and the heat-source-side refrigerant to exchange heat with each other and to evaporate and gasify or condense and liquefy the heat-source-side refrigerant. The accumulator 19 is disposed on the suction side of the compressor 10 and is configured to accumulate a redundant refrigerant resulting from the difference between that in heating operation and that in cooling operation or a redundant refrigerant corresponding to a change in transitional operation.

The check valve 13c is disposed on the refrigerant pipe 4 between the relay unit 2 and the first refrigerant flow switching device 11 and is configured to permit the stream of the heat-source-side refrigerant in only a predetermined direction (direction from the relay unit 2 toward the outdoor unit 1). The check valve 13a is disposed on the refrigerant pipe 4 between the heat-source-side heat exchanger 12 and the relay unit 2 and is configured to permit the stream of the heat-source-side refrigerant in only a predetermined direction (direction from the outdoor unit 1 toward the relay unit 2). The check valve 13d is disposed on the refrigerant connection pipe 4a and is configured to direct the heat-source-side refrigerant discharged from the compressor 10 to the relay unit 2 in heating operation. The check valve 13b is disposed on the refrigerant connection pipe 4b and is configured to direct the heat-source-side refrigerant returning from the relay unit 2 to the suction side of the compressor 10 in heating operation.

The refrigerant connection pipe 4a connects the refrigerant pipe 4 between the first refrigerant flow switching device 11 and the check valve 13c and the refrigerant pipe 4 between the check valve 13a and the relay unit 2 inside the outdoor unit 1. The refrigerant connection pipe 4b connects the refrigerant pipe 4 between the check valve 13c and the relay unit 2 and the refrigerant pipe 4 between the heat-source-side heat exchanger 12 and the check valve 13a inside the outdoor unit 1. FIG. 2 illustrates the case where the refrigerant connection pipes 4a and 4b and the check valves 13a to 13d are included as an example. Other cases are also applicable. The refrigerant connection pipes 4a and 4b and the check valves 13a to 13d are optional.

[Indoor Unit 3]

Each of the indoor units 3 incorporates a use-side heat exchanger 35. The use-side heat exchanger 35 is connected to a heat medium flow control device 34 and a second heat medium flow switching device 33 in the relay unit 2 by the pipes 5. The use-side heat exchanger 35 is configured to cause air supplied from an air-sending device, such as a fan, which is not illustrated, and the heat medium to exchange heat with each other and to generate heating air or cooling air to be supplied to the indoor space 7.

FIG. 2 illustrates the case where the four indoor units 3 are connected to the relay unit 2, as an example. The four indoor units 3 are illustrated as indoor units 3a, 3b, 3c, and 3d from above in the drawing. The use-side heat exchangers 35 are illustrated as use-side heat exchangers 35a, 35b, 35c, and 35d from above in the drawing in accordance with the indoor units 3a, 3b, 3c, and 3d. As in the case illustrated in FIG. 1, the number of connected indoor units 3 is not limited to four, which is in illustrated in FIG. 2.

[Relay Unit 2]

The relay unit 2 incorporates at least two or more intermediate heat exchangers 25, two expansion devices 26, two opening and closing devices (opening and closing device 27 and opening and closing device 29), two second refrigerant flow switching devices 28, two heat-medium conveying devices (hereinafter referred to as pumps 31), four first heat medium flow switching devices 32, the four second heat medium flow switching devices 33, and the four heat medium flow control devices 34.

Each of the two intermediate heat exchangers 25 (intermediate heat exchangers 25*a* and 25*b*) functions as a condenser (radiator) in supplying heating energy to the indoor unit 3 performing heating operation, functions as an evaporator in supplying cooling energy to the indoor unit 3 performing cooling operation, and is configured to cause the heat-source-side refrigerant and the heat medium to exchange heat with each other and to transmit the cooling energy or heating energy generated in the outdoor unit 1 and stored in the heat-source-side refrigerant to the heat medium. The intermediate heat exchanger 25*a* is disposed between the expansion device 26*a* and the second refrigerant flow switching device 28*a* in the refrigerant circuit A and is configured to work for cooling the heat medium in cooling and heating mixed operation mode. The intermediate heat exchanger 25*b* is disposed between the expansion device 26*b* and the second refrigerant flow switching device 28*b* in the refrigerant circuit A and is configured to work for heating the heat medium in cooling and heating mixed operation mode.

The two expansion devices 26 (expansion devices 26*a* and 26*b*) have the functions as a pressure reducing valve and an expansion valve and are configured to reduce the pressure of the heat-source-side refrigerant and expand it. The expansion device 26*a* is disposed on the upstream side of the intermediate heat exchanger 25*a* in the stream of the heat-source-side refrigerant in cooling operation. The expansion device 26*b* is disposed on the upstream side of the intermediate heat exchanger 25*b* in the stream of the heat-source-side refrigerant in cooling operation. One example of each of the two expansion devices 26 may be a device whose opening degree is variably controllable, such as an electronic expansion valve.

One example of each of the two opening and closing devices (opening and closing devices 27 and 29) may be a solenoid valve that can be opened and closed by energization. The two opening and closing devices are configured to open and close the refrigerant pipe 4. That is, the opening and closing of the two opening and closing devices is controlled in accordance with the operation mode, and they switch the flow of the heat-source-side refrigerant. The opening and closing device 27 is disposed on the refrigerant pipe 4 on the inlet side of the heat-source-side refrigerant (lowest refrigerant pipe 4 from among the refrigerant pipes 4 connecting the outdoor unit 1 and the relay unit 2 in the drawing). The opening and closing device 29 is disposed on the pipe (bypass pipe 20) connecting the refrigerant pipe 4 on the inlet side of the heat-source-side refrigerant and the refrigerant pipe 4 on the outlet side thereof. The opening and closing devices 27 and 29 are any device that can switch the refrigerant flow. One such example may be a device whose opening degree is variably controllable, such as an electronic expansion valve.

One example of each of the two second refrigerant flow switching devices 28 (second refrigerant flow switching devices 28*a* and 28*b*) may be a four-way valve. The second refrigerant flow switching devices 28 are configured to switch the stream of the heat-source-side refrigerant such that the intermediate heat exchangers 25 serve as a condenser or evaporator in accordance with the operation mode. The second refrigerant flow switching device 28*a* is disposed on the downstream side of the intermediate heat exchanger 25*a* in the stream of the heat-source-side refrigerant in cooling operation. The second refrigerant flow switching device 28*b* is disposed on the downstream side of the intermediate heat exchanger 25*b* in the stream of the heat-source-side refrigerant in cooling only operation mode.

The two pumps 31 (pumps 31*a* and 31*b*) are configured to cause the heat medium traveling through the pipes 5 to circulate through the heat medium circuit B. The pump 31*a* is disposed on the pipe 5 between the intermediate heat exchanger 25*a* and the second heat medium flow switching device 33. The pump 31*b* is disposed on the pipe 5 between the intermediate heat exchanger 25*b* and the second heat medium flow switching device 33. One example of each of the two pumps 31 may be a pump whose capacity is controllable, and it may be preferred that the flow rate in the pump 31 is adjustable in accordance with the magnitude of the load in the indoor unit 3.

One example of each of the four first heat medium flow switching devices 32 (first heat medium flow switching devices 32*a* to 32*d*) may be a three-way valve. The first heat medium flow switching devices 32 are configured to switch the heat-medium flow path between the intermediate heat exchangers 25*a* and 25*b*. The number of first heat medium flow switching devices 32 corresponds to the number of indoor units 3 disposed (here, four). Each of the first heat medium flow switching devices 32 has three ports: a first one is connected to the intermediate heat exchanger 25*a*, a second one is connected to the intermediate heat exchanger 25*b*, and a third one is connected to the heat medium flow control device 34. The first heat medium flow switching device 32 is disposed on the outlet side of the heat-medium flow path in the use-side heat exchanger 35. The first heat medium flow switching devices 32 are illustrated as first heat medium flow switching devices 32*a* to 32*d* from above in the drawing in accordance with the indoor units 3. The switching of the heat-medium flow path includes not only full switching from one to another but also partial switching from one to another.

One example of each of the four second heat medium flow switching devices 33 (second heat medium flow switching devices 33*a* to 33*d*) may be a three-way valve. The second heat medium flow switching devices 33 are configured to switch the heat-medium flow paths between the intermediate heat exchangers 25*a* and 25*b*. The number of second heat medium flow switching devices 33 corresponds to the number of indoor units 3 disposed (here, four). Each of the second heat medium flow switching devices 33 has three ports: a first one is connected to the intermediate heat exchanger 25*a*, a second one is connected to the intermediate heat exchanger 25*b*, and a third one is connected to the use-side heat exchanger 35. The second heat medium flow switching device 33 is disposed on the inlet side of the heat-medium flow path in the use-side heat exchanger 35. The second heat medium flow switching devices 33 are illustrated as second heat medium flow switching devices 33*a* to 33*d* from above in the drawing in accordance with the indoor units 3. The switching of the heat-medium flow paths includes not only full switching from one to another but also partial switching from one to another.

One example of each of the four heat medium flow control devices 34 (heat medium flow control devices 34*a* to 34*d*) may be a two-way valve whose opening port area is controllable. The heat medium flow control devices 34 are configured to switch the flow rate of the heat medium flowing in the pipes 5. The number of heat medium flow control devices 34 corresponds to the number of indoor units 3 disposed (here, four). Each of the heat medium flow control devices 34 has two ports: one is connected to the use-side heat exchanger 35 and another is connected to the first heat medium flow switching device 32. The heat medium flow control device 34 is disposed on the outlet side of the heat-medium flow path in the use-side heat exchanger 35. That is, the heat medium flow control device 34 is configured to adjust the amount of the heat medium flowing into the indoor unit 3 in accordance with the temperature of the heat medium flowing into the indoor unit 3 and the temperature of the heat medium exiting therefrom and to enable an optimal amount of the heat medium corresponding to the indoor load to be provided to the indoor unit 3.

The heat medium flow control devices 34 are illustrated as heat medium flow control devices 34a to 34d from above in the drawing in accordance with the indoor units 3. Each of the heat medium flow control devices 34 may be disposed on the inlet side of the heat-medium flow path in the use-side heat exchanger 35. The heat medium flow control device 34 may also be disposed on the inlet side of the heat-medium flow path in the use-side heat exchanger 35 and between the second heat medium flow switching device 33 and the use-side heat exchanger 35. If no load is required in the indoor unit 3, for example, in the case where the indoor unit 3 is inactive or in a thermostat off state, the supply of the heat medium to the indoor unit 3 can be stopped by fully closing the heat medium flow control device 34.

If the first heat medium flow switching device 32 or second heat medium flow switching device 33 has the function of the heat medium flow control device 34, the heat medium flow control device 34 can be omitted.

The relay unit 2 includes temperature sensors 40 (temperature sensors 40a and 40b) for detecting temperatures of the heat medium on the outlet sides of the intermediate heat exchangers 25. Information (temperature information) detected by the temperature sensors 40 is sent to a controller 50 configured to control actions of the air-conditioning apparatus 100, and it is used in controlling a driving frequency of the compressor 10, a rotation speed of the air-sending device, which is not illustrated, switching of the first refrigerant flow switching device 11, driving frequencies of the pumps 31, switching of the second refrigerant flow switching devices 28, switching of the heat-medium flow paths, adjustment of the flow rate of the heat medium in the indoor unit 3, and the like. The state where the controller 50 is incorporated separately from the other units is illustrated as an example. Other cases are also applicable. The controller 50 may be incorporated in at least one of the outdoor unit 1, indoor units 3, and relay unit 2 or incorporated in each unit such that they can communicate with one another.

The controller 50 may include a microcomputer or the like and controls the actuators (driving components such as the pumps 31, first heat medium flow switching devices 32, second heat medium flow switching devices 33, expansion devices 26, second refrigerant flow switching devices 28, and the like), for example, controls the driving frequency of the compressor 10, the rotation speed of the air-sending device (including ON/OFF), the switching of the first refrigerant flow switching device 11, the driving of the pumps 31, the opening degrees of the expansion devices 26, the opening degrees of the opening and closing devices, the switching of the second refrigerant flow switching devices 28, the switching of the first heat medium flow switching devices 32, the switching of the second heat medium flow switching devices 33, the driving of the heat medium flow control devices 34, and the like on the basis of information detected by various kinds of detecting means and an instruction from a remote controller to implement each operation mode described below and switch the heat-medium flow paths to the heat-medium heat storage tank.

The pipes 5 allowing the heat medium to travel therethrough includes the pipe connected to the intermediate heat exchanger 25a and the pipe connected to the intermediate heat exchanger 25b. The pipes 5 are split (here, in four) in accordance with the number of indoor units 3 connected to the relay unit 2. The pipes 5 are connected at the first heat medium flow switching devices 32 and the second heat medium flow switching devices 33. Whether the heat medium from the intermediate heat exchanger 25a is to flow into the use-side heat exchanger 35 or the heat medium from the intermediate heat exchanger 25b is to flow into the use-side heat exchanger 35 is determined by controlling the first heat medium flow switching devices 32 and the second heat medium flow switching devices 33.

In the air-conditioning apparatus 100, the compressor 10, first refrigerant flow switching device 11, heat-source-side heat exchanger 12, opening and closing device 27, opening and closing device 29, second refrigerant flow switching devices 28, refrigerant flow paths in the intermediate heat exchangers 25, expansion devices 26, and accumulator 19 are connected together by the refrigerant pipes 4, and they constitute the refrigerant circuit A. The heat medium flows in the intermediate heat exchangers 25, pumps 31, first heat medium flow switching devices 32, heat medium flow control devices 34, use-side heat exchangers 35, and second heat medium flow switching devices 33 are connected by the pipes 5, and they constitute the heat medium circuit B. That is, the plurality of use-side heat exchangers 35 are connected in parallel to each of the intermediate heat exchangers 25, and the heat medium circuit B has a plurality of blocks.

Accordingly, in the air-conditioning apparatus 100, the outdoor unit 1 and relay unit 2 are connected through the intermediate heat exchangers 25a and 25b included in the relay unit 2. The relay unit 2 and indoor units 3 are connected through the intermediate heat exchangers 25a and 25b. That is, in the air-conditioning apparatus 100, the heat-source-side refrigerant circulating in the refrigerant circuit A and the heat medium circulating in the heat medium circuit B exchange heat with each other in the intermediate heat exchangers 25a and 25b. With this configuration, the air-conditioning apparatus 100 can achieve optimal cooling operation or heating operation corresponding to the indoor load.

[Operation Modes]

The operation modes implemented by the air-conditioning apparatus 100 are described. The air-conditioning apparatus 100 can perform cooling operation or heating operation in each of the indoor units 3 on the basis of an instruction from that indoor unit 3. That is, the air-conditioning apparatus 100 can perform the same operation in all of the indoor units 3 and can also perform different operations in the indoor units 3.

The operation modes implemented by the air-conditioning apparatus 100 include a cooling only operation mode in which all of the driving indoor units 3 performs cooling operation, a heating only operation mode in which all of the driving indoor units 3 performs heating operation, and a cooling and heating mixed operation mode. The cooling and heating mixed operation mode includes a cooling main operation mode in which the cooling load is larger than the heating load and a heating main operation mode in which the heating load is larger than the cooling load. The operation modes are described below using the streams of the heat-source-side refrigerant and the heat medium.

[Heating Only Operation Mode]

Figure 3:
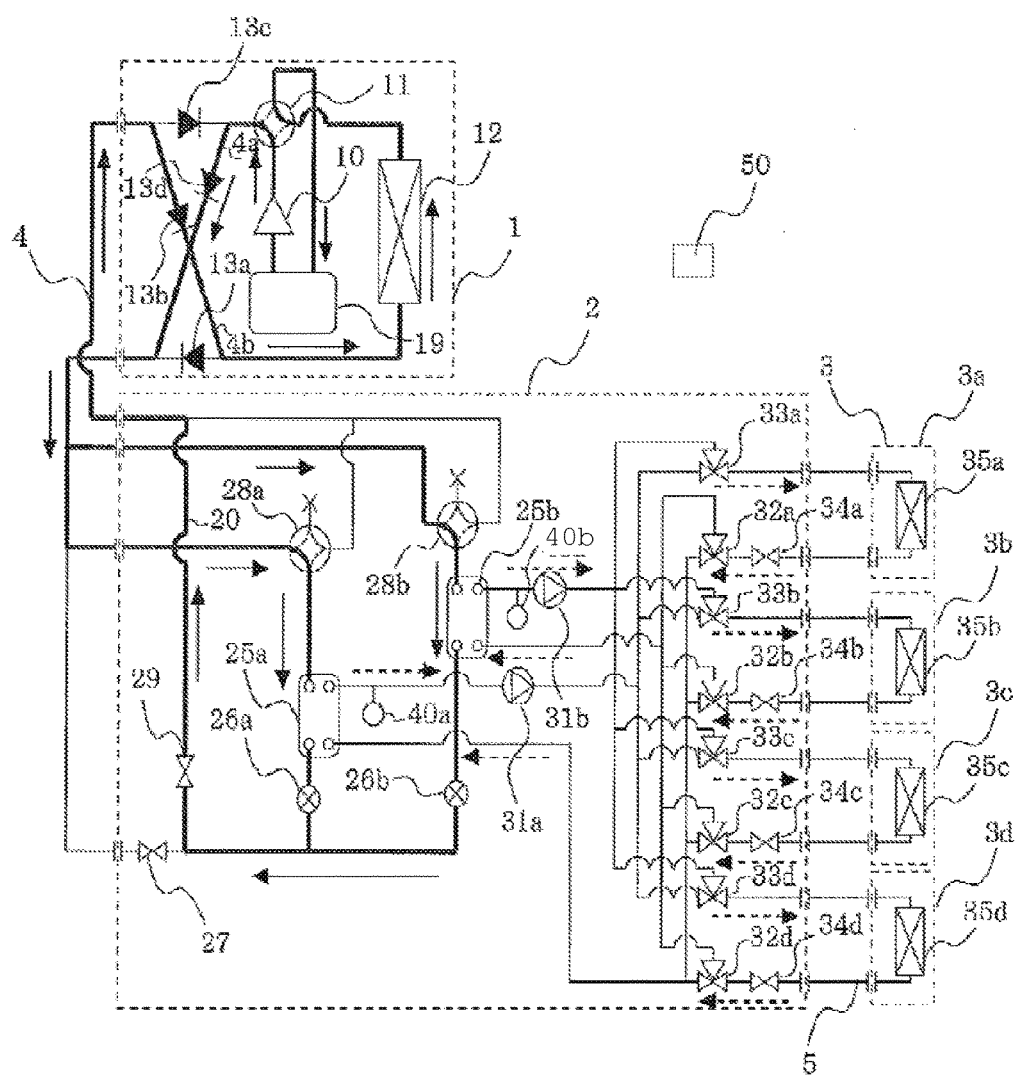
FIG. 3 is a refrigerant circuit diagram that illustrates a stream of a refrigerant in heating only operation mode in the air-conditioning apparatus according to Embodiment of the present invention.

FIG. 3 is a refrigerant circuit diagram that illustrates the stream of the refrigerant in heating only operation mode in the air-conditioning apparatus 100. With reference to FIG. 3, the heating only operation mode is described using the case where the heating energy load is generated in all the use-side heat exchangers 35a to 35d, as an example. In FIG. 3, the pipes indicated by the thick lines are the pipes in which the heat-source-side refrigerant flow paths. In FIG. 3, the directions in which the heat-source-side refrigerant flow paths are indicated by the solid line arrows, and the directions in which the heat medium flows are indicated by the broken line arrows.

In the case of the heating only operation mode illustrated in FIG. 3, in the outdoor unit 1, the first refrigerant flow switching device 11 is switched such that the heat-source-side refrigerant discharged from the compressor 10 flows into the relay unit 2 without passing through the heat-source-side heat exchanger 12.

In the relay unit 2, the pumps 31a and 31b are driven, the heat medium flow control devices 34a to 34d are opened, and the heat medium is circulated between each of the intermediate heat exchangers 25a and 25b and each of the use-side heat exchangers 35a to 35d. The second refrigerant flow switching devices 28a and 28b are switched to the heating side, the opening and closing device 27 is closed, and the opening and closing device 29 is opened.

First, the stream of the heat-source-side refrigerant in the refrigerant circuit A is described.

A low-temperature and low-pressure refrigerant is compressed by the compressor 10 into a high-temperature and high-pressure gas refrigerant, and the gas refrigerant is discharged. The high-temperature and high-pressure gas refrigerant discharged from the compressor 10 passes through the first refrigerant flow switching device 11, travels in the refrigerant connection pipe 4a, passes through the check valve 13d, and exits from the outdoor unit 1. The high-temperature and high-pressure gas refrigerant exiting from the outdoor unit 1 runs through the refrigerant pipe 4 and flows into the relay unit 2. The high-temperature and high-pressure gas refrigerant flowing to the relay unit 2 is split, and the gas refrigerants pass through the second refrigerant flow switching devices 28a and 28b and flow into the intermediate heat exchangers 25a and 25b, respectively.

The high-temperature and high-pressure gas refrigerants flowing to the intermediate heat exchangers 25a and 25b condense and liquefy while transferring heat to the heat medium circulating in the heat medium circuit B and become high-pressure liquid refrigerants. The liquid refrigerants exiting from the intermediate heat exchangers 25a and 25b are expanded by the expansion devices 26a and 26b and become low-temperature and low-pressure two-phase refrigerants. The two-phase refrigerants join with each other, and the refrigerant passes through the opening and closing device 29, exits from the relay unit 2, runs through the refrigerant pipe 4, and flows into the outdoor unit 1 again. The refrigerant flowing to the outdoor unit 1 travels in the refrigerant connection pipe 4b, passes through the check valve 13b, and flows into the heat-source-side heat exchanger 12 functioning as an evaporator.

The heat-source-side refrigerant flowing to the heat-source-side heat exchanger 12 receives heat from air in the outdoor space 6 (hereinafter referred to as outside air) in the heat-source-side heat exchanger 12 and becomes a low-temperature and low-pressure gas refrigerant. The low-temperature and low-pressure gas refrigerant existing from the heat-source-side heat exchanger 12 passes through the first refrigerant flow switching device 11 and the accumulator 19 and is sucked into the compressor 10 again.

At that time, the opening degree of the expansion device 26 is controlled such that the subcool (degree of subcooling) obtained as the difference between the value in which the pressure of the heat-source-side refrigerant flowing between the intermediate heat exchanger 25 and the expansion device 26 is converted into a saturated temperature and the temperature on the outlet side of the intermediate heat exchanger 25 is constant. When the temperature at an intermediate location of the intermediate heat exchanger 25 can be measured, the temperature at the intermediate location may be used in place of the saturated temperature obtained by the conversion. In that case, no pressure sensor is needed, and the system can be inexpensive.

Next, the stream of the heat medium in the heat medium circuit B is described.

In heating only operation mode, the heating energy of the heat-source-side refrigerant is transmitted to the heat medium in both the intermediate heat exchangers 25a and 25b, and the warmed heat medium is made to flow inside the pipes 5 by the pumps 31a and 31b. The heat medium is pressurized by each of the pumps 31a and 31b, exits therefrom, and flows into the use-side heat exchangers 35a to 35d through the second heat medium flow switching devices 33a to 33d. The heat medium transfers heat to the indoor air in each of the use-side heat exchangers 35a to 35d, thereby heating the indoor space 7.

The heat media exit from the use-side heat exchangers 35a to 35d and flow into the heat medium flow control devices 34a to 34d. At that time, the heat media flow into the use-side heat exchangers 35a to 35d at flow rates adjusted to those required to produce the air conditioning load required in the insides of the rooms by the workings of the heat medium flow control devices 34a to 34d. The heat media exiting from the heat medium flow control devices 34a to 34d pass through the first heat medium flow switching devices 32a to 32d, flow into the intermediate heat exchangers 25a and 25b, take the amount of heat corresponding to the heat supplied to the indoor space 7 through the indoor units 3 from the refrigerant side, and are sucked into the pumps 31a and 31b again.

In the pipe 5 in the use-side heat exchanger 35, the heat medium flows in the direction from the second heat medium flow switching device 33 through the heat medium flow control device 34 toward the first heat medium flow switching device 32. The air conditioning load required in the indoor space 7 can be produced by controlling in which the difference between the temperature detected by the temperature sensor 40a or the temperature detected by the temperature sensor 40b and the temperature of the heat medium exiting from the use-side heat exchanger 35 is kept at a target value. As the temperature of the outlet of the intermediate heat exchanger 25, either one of the temperature detected by the temperature sensor 40a or that by the temperature sensor 40b may be used or the mean temperature thereof may also be used.

At that time, each of the first heat medium flow switching device 32 and the second heat medium flow switching device 33 is controlled such that its opening degree is an intermediate opening degree or an opening degree corresponding to the temperatures of the heat media on the outlets of the intermediate heat exchangers 25a and 25b in order to provide the flows toward both the intermediate heat exchangers 25a and 25b. Originally, the use-side heat exchanger 35 should be controlled using the difference between the temperature on its inlet and that on its outlet.

However, because the temperature of the heat medium on the inlet side of the use-side heat exchanger 35 is substantially the same as the temperature detected by the temperature sensor 40b, the use of the temperature sensor 40b can reduce the number of temperature sensors and can result in an inexpensive system configuration.

To implement the heating only operation mode, because it is not necessary to cause the heat medium to flow into a use-side heat exchanger 35 having no heat load (including a thermostat off state), the flow is closed by the heat medium flow control device 34 to prevent the heat medium from flowing into that use-side heat exchanger 35. In FIG. 3, because each of all the use-side heat exchangers 35a to 35d has a heat load, the heat media flow into them. If the heat load is lost, the corresponding heat medium flow control device 34 may be fully closed. If a heat load is generated again, the corresponding heat medium flow control device 34 may be opened, and the heat medium may be circulated. The same applies to the other operation modes described below.

[Cooling Only Operation Mode]

Figure 4:
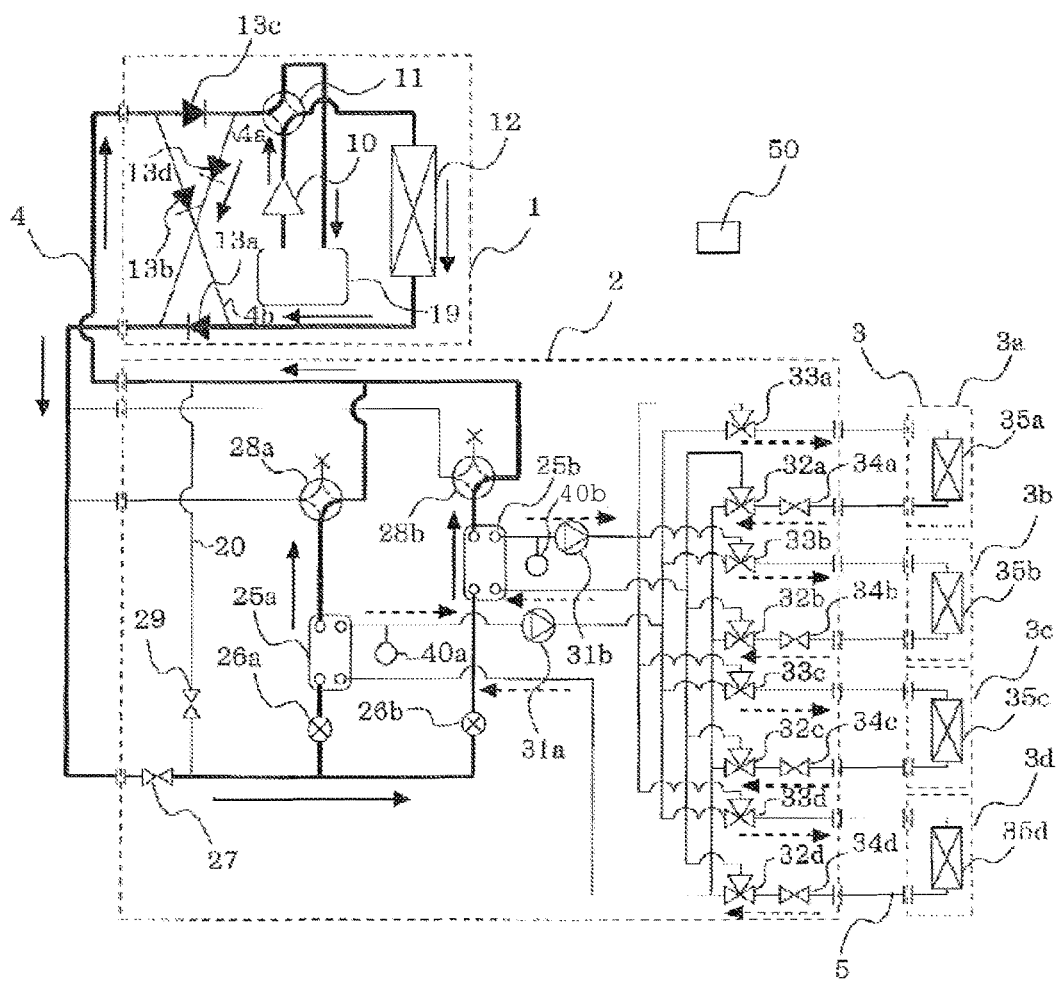
FIG. 4 is a refrigerant circuit diagram that illustrates the stream of the refrigerant in cooling only operation mode in the air-conditioning apparatus according to Embodiment of the present invention.

FIG. 4 is a refrigerant circuit diagram that illustrates the stream of the refrigerant in cooling only operation mode in the air-conditioning apparatus 100. With reference to FIG. 4, the cooling only operation mode is described using the case where the cooling energy load is generated in all the use-side heat exchangers 35a to 35d, as an example. In FIG. 4, the pipes indicated by the thick lines are the pipes in which the heat-source-side refrigerant flow paths. In FIG. 4, the directions in which the heat-source-side refrigerant flow paths are indicated by the solid line arrows, and the directions in which the heat medium flows are indicated by the broken line arrows.

In the case of the cooling only operation mode illustrated in FIG. 4, in the outdoor unit 1, the first refrigerant flow switching device 11 is switched such that the heat-source-side refrigerant discharged from the compressor 10 flows into the heat-source-side heat exchanger 12.

In the relay unit 2, the pumps 31a and 31b are driven, the heat medium flow control devices 34a to 34d are opened, and the heat medium is circulated between each of the intermediate heat exchangers 25a and 25b and each of the use-side heat exchangers 35a to 35d. The second refrigerant flow switching devices 28a and 28b are switched to the cooling side, the opening and closing device 27 is opened, and the opening and closing device 29 is closed.

First, the stream of the heat-source-side refrigerant in the refrigerant circuit A is described.

A low-temperature and low-pressure refrigerant is compressed by the compressor 10 into a high-temperature and high-pressure gas refrigerant, and the gas refrigerant is discharged. The high-temperature and high-pressure gas refrigerant discharged from the compressor 10 passes through the first refrigerant flow switching device 11 and then the heat-source-side heat exchanger 12, exchanges heat with the outside air, becomes a high-temperature and high-pressure liquid or two-phase refrigerant, passes through the check valve 13a, travels in the refrigerant connection pipe 4a, and exits from the outdoor unit 1. The high-temperature and high-pressure liquid or two-phase refrigerant exiting from the outdoor unit 1 runs through the refrigerant pipe 4 and flows into the relay unit 2.

The high-temperature and high-pressure liquid or two-phase refrigerant flowing to the relay unit 2 passes through the opening and closing device 27 and is then split, and the refrigerants are expanded by the expansion devices 26a and 26b and become low-temperature and low-pressure two-phase refrigerants. The low-temperature and low-pressure two-phase refrigerants evaporate and gasify while receiving heat from the heat medium circulating in the heat medium circuit B and become low-temperature gas refrigerants. The gas refrigerants exiting from the intermediate heat exchangers 25a and 25b pass through the second refrigerant flow switching devices 28a and 28b, exit from the relay unit 2, travel in the refrigerant pipe 4, pass through the check valve 13c, pass through the first refrigerant flow switching device 11 and the accumulator 19, and are sucked into the compressor 10 again.

At that time, the opening degree of the expansion device 26 is controlled such that the superheat (degree of superheat) obtained as the difference between the value in which the pressure of the heat-source-side refrigerant flowing between the intermediate heat exchanger 25 and the expansion device 26 is converted into a saturated temperature and the temperature on the outlet side of the intermediate heat exchanger 25 is constant. When the temperature at an intermediate location of the intermediate heat exchanger 25 can be measured, the temperature at the intermediate location may be used in place of the saturated temperature obtained by the conversion. In that case, no pressure sensor is needed, and the system can be inexpensive.

Next, the stream of the heat medium in the heat medium circuit B is described.

In cooling only operation mode, the cooling energy of the heat-source-side refrigerant is transmitted to the heat medium in both the intermediate heat exchangers 25a and 25b, and the cooled heat medium is pressurized by each of the pumps 31a and 31b, exits therefrom, and flows into the use-side heat exchangers 35a to 35d through the second heat medium flow switching devices 33a to 33d. The heat medium receives heat from the indoor air in each of the use-side heat exchangers 35a to 35d, thereby cooling the indoor space 7.

The heat media exit from the use-side heat exchangers 35a to 35d and flow into the heat medium flow control devices 34a to 34d. At that time, the heat media flow into the use-side heat exchangers 35a to 35d at flow rates adjusted to those required to produce the air conditioning load required in the insides of the rooms by the workings of the heat medium flow control devices 34a to 34d. The heat media exiting from the heat medium flow control devices 34a to 34d pass through the first heat medium flow switching devices 32a to 32d, flow into the intermediate heat exchangers 25a and 25b, provide the refrigerant side with the amount of heat corresponding to the heat received from the indoor space 7 through the indoor units 3, and are sucked into the pumps 31a and 31b again.

In the pipe 5 in the use-side heat exchanger 35, the heat medium flows in the direction from the second heat medium flow switching device 33 through the heat medium flow control device 34 toward the first heat medium flow switching device 32. The air conditioning load required in the indoor space 7 can be produced by controlling in which the difference between the temperature detected by the temperature sensor 40a or the temperature detected by the temperature sensor 40b and the temperature of the heat medium exiting from the use-side heat exchanger 35 is kept at a target value. As the temperature of the outlet of the intermediate heat exchanger 25, either one of the temperature detected by the temperature sensor 40a or that by the temperature sensor 40b may be used or the mean temperature thereof may also be used.

At that time, each of the first heat medium flow switching device 32 and the second heat medium flow switching device 33 is controlled to such that its opening degree is an intermediate opening degree or an opening degree corresponding to the temperatures of the heat media on the outlets of the intermediate heat exchangers 25a and 25b in order to provide the flows toward both the intermediate heat exchangers 25a and 25b. Originally, the use-side heat exchanger 35 should be controlled using the difference between the temperature on its inlet and that on its outlet. However, because the temperature of the heat medium on the inlet side of the use-side heat exchanger 35 is substantially the same as the temperature detected by the temperature sensor 40b, the use of the temperature sensor 40b can reduce the number of temperature sensors and can result in an inexpensive system configuration.

[Cooling and Heating Mixed Operation Mode]

Figure 5:
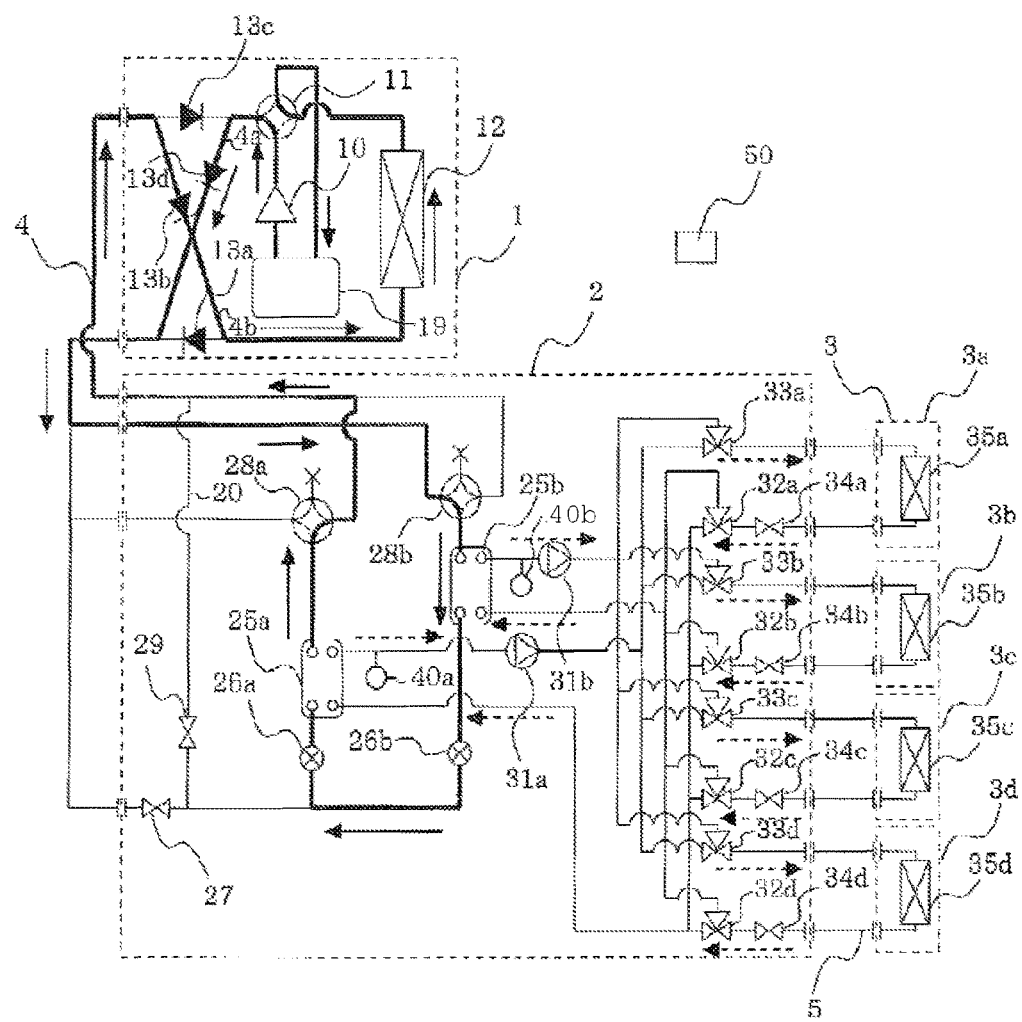
FIG. 5 is a refrigerant circuit diagram that illustrates the stream of the refrigerant in cooling and heating mixed operation mode in the air-conditioning apparatus according to Embodiment of the present invention.

FIG. 5 is a refrigerant circuit diagram that illustrates the stream of the refrigerant in cooling and heating mixed operation mode in the air-conditioning apparatus 100. With reference to FIG. 5, heating main operation mode is described. The heating main operation mode is included in the cooling and heating mixed operation, which is the case where a heating energy load is generated in one or more of the use-side heat exchangers 35 and a cooling energy load is generated in the rest of the use-side heat exchangers 35. In FIG. 5, the pipes indicated by the thick lines are the pipes in which the heat-source-side refrigerant circulates. In FIG. 5, the directions in which the heat-source-side refrigerant flow paths are indicated by the solid line arrows, and the directions in which the heat medium flows are indicated by the broken line arrows.

In the case of the heating main operation mode illustrated in FIG. 5, in the outdoor unit 1, the first refrigerant flow switching device 11 is switched such that the heat-source-side refrigerant discharged from the compressor 10 flows into the relay unit 2 without passing through the heat-source-side heat exchanger 12. In the relay unit 2, the pumps 31a and 31b are driven, the heat medium flow control devices 34a to 34d are opened, and the heat medium is circulated between the intermediate heat exchanger 25a and a use-side heat exchanger 35 in which a cooling energy load is generated and is circulated between the intermediate heat exchanger 25b and a use-side heat exchanger 35 in which a heating energy load is generated. The second refrigerant flow switching device 28a is switched to the cooling side, and the second refrigerant flow switching device 28b is switched to the heating side. The expansion device 26a is fully opened, the opening and closing device 27 is closed, and the opening and closing device 29 is closed.

First, the stream of the heat-source-side refrigerant in the refrigerant circuit A is described.

A low-temperature and low-pressure refrigerant is compressed by the compressor 10 into a high-temperature and high-pressure gas refrigerant, and the gas refrigerant is discharged. The high-temperature and high-pressure gas refrigerant discharged from the compressor 10 passes through the first refrigerant flow switching device 11, travels in the refrigerant connection pipe 4a, passes through the check valve 13d, and exits from the outdoor unit 1. The high-temperature and high-pressure gas refrigerant exiting from the outdoor unit 1 runs through the refrigerant pipe 4 and flows into the relay unit 2. The high-temperature and high-pressure gas refrigerant flowing to the relay unit 2 passes through the second refrigerant flow switching device 28b and flows into the intermediate heat exchanger 25b serving as a condenser.

The gas refrigerant flowing to the intermediate heat exchanger 25b condenses and liquefies while transferring heat to the heat medium circulating in the heat medium circuit B and becomes a liquid refrigerant. The liquid refrigerant exiting from the intermediate heat exchanger 25b is expanded by the expansion device 26b and becomes a low-pressure two-phase refrigerant. The low-pressure two-phase refrigerant passes through the expansion device 26a and flows into the intermediate heat exchanger 25a serving as an evaporator. The low-pressure two-phase refrigerant flowing to the intermediate heat exchanger 25a is evaporated by receiving heat from the heat medium circulating in the heat medium circuit B and cools the heat medium. The low-pressure two-phase refrigerant exits from the intermediate heat exchanger 25a, passes through the second refrigerant flow switching device 28a, exits from the relay unit 2, runs through the refrigerant pipe 4, and flows into the outdoor unit 1 again.

The low-temperature and low-pressure two-phase refrigerant flowing to the outdoor unit 1 passes through the check valve 13b and flows into the heat-source-side heat exchanger 12 serving as an evaporator. The refrigerant flowing to the heat-source-side heat exchanger 12 receives heat from the outside air in the heat-source-side heat exchanger 12 and becomes a low-temperature and low-pressure gas refrigerant. The low-temperature and low-pressure gas refrigerant exiting from the heat-source-side heat exchanger 12 passes through the first refrigerant flow switching device 11 and the accumulator 19 and is sucked into the compressor 10 again.

The opening degree of the expansion device 26b is controlled such that the subcool (degree of subcooling) of the refrigerant on the outlet of the intermediate heat exchanger 25b is a target value. The expansion device 26b may be fully opened, and the subcool may be controlled by the expansion device 26a.

Next, the stream of the heat medium in the heat medium circuit B is described.

In heating main operation mode, the heating energy of the heat-source-side refrigerant is transmitted to the heat medium in the intermediate heat exchanger 25b, and the warmed heat medium is made to flow inside the pipes 5 by the pump 31b. In heating main operation mode, the cooling energy of the heat-source-side refrigerant is transmitted to the heat medium in the intermediate heat exchanger 25a, and the cooled heat medium is made to flow inside the pipes 5 by the pump 31a. The cooled heat medium is pressurized by the pump 31a, exits therefrom, and flows into the use-side heat exchanger 35 in which the cooling energy load is generated through the second heat medium flow switching device 33. The heat medium is pressurized by the pump 31b, exits therefrom, and flows into the use-side heat exchanger 35 in which the heating energy load is generated through the second heat medium flow switching device 33.

At that time, when the indoor unit 3 is in heating operation mode, the second heat medium flow switching device 33 connected to that indoor unit 3 is switched to the direction in which it is connected to the intermediate heat exchanger 25b and the pump 31b. When the indoor unit 3 is in cooling operation mode, the second heat medium flow switching device 33 connected to that indoor unit 3 is switched to the direction in which it is connected to the intermediate heat exchanger 25a and the pump 31a. That is, the second heat medium flow switching device 33 can enable switching the heat medium to be supplied to the indoor unit 3 between that for heating and that for cooling.

The use-side heat exchanger 35 performs the cooling operation on the indoor space 7 using the heat medium receiving heat from the indoor air or performs the heating operation on the indoor space 7 using the heat medium transferring heat to the indoor air. At that time, the heat medium flows into the use-side heat exchanger 35 at a flow rate adjusted to that required to produce the air conditioning load required in the inside of the room by the workings of the heat medium flow control device 34.

The heat medium used in the cooling operation, passing through the use-side heat exchanger 35, and slightly increasing its temperature passes through the heat medium flow control device 34 and the first heat medium flow switching device 32, flows into the intermediate heat exchanger 25*a*, and is sucked into the pump 31*a* again. The heat medium used in the heating operation, passing through the use-side heat exchanger 35, and slightly decreasing its temperature passes through the heat medium flow control device 34 and the first heat medium flow switching device 32, flows into the intermediate heat exchanger 25*b*, and is sucked into the pump 31*a* again. At that time, when the indoor unit 3 is in heating operation mode, the first heat medium flow switching device 32 connected to that indoor unit 3 is switched to the direction in which it is connected to the intermediate heat exchanger 25*b* and the pump 31*b*. When the indoor unit 3 is in cooling operation mode, the first heat medium flow switching device 32 connected to that indoor unit 3 is switched to the direction in which it is connected to the intermediate heat exchanger 25*a* and the pump 31*a*.

During this state, the workings of the first heat medium flow switching device 32 and the second heat medium flow switching device 33 enable the warm heat medium and cold heat medium to be guided to a use-side heat exchanger 35 in which the heating energy load is generated and another use-side heat exchanger 35 in which the cooling energy load is generated, respectively, without mixing with each other. In this manner, the heat medium used in the heating operation mode flows into the intermediate heat exchanger 25*b*, where the refrigerant provides heat as a heating purpose, the heat medium used in the cooling operation mode flows into the intermediate heat exchanger 25*a*, where the refrigerant receives heat as a cooling purpose, and the heat media exchange heat with the respective refrigerants again and are conveyed to the pumps 31*a* and 31*b*, respectively.

In the pipe 5 in the use-side heat exchanger 35, the heat medium flows in the direction from the second heat medium flow switching device 33 through the heat medium flow control device 34 toward the first heat medium flow switching device 32 on both the heating side and cooling side. The air conditioning load required in the indoor space 7 can be produced by controlling in which the difference between the temperature detected by the temperature sensor 40*b* and the temperature of the heat medium exiting from the use-side heat exchanger 35 on the heating side and the difference between the temperature detected by the temperature sensor 40*a* and the temperature of the heat medium exiting from the use-side heat exchanger 35 on the cooling side are kept at target values.

The stream of the heat-source-side refrigerant in the refrigerant circuit A and the stream of the heat medium in the heat medium circuit B in cooling main operation mode is similar to those in the heating main operation mode. The cooling main operation mode is included in the mixed operation, which is the case where a cooling energy load is generated in one or more of the use-side heat exchangers 35 and a heating energy load is generated in the rest of the use-side heat exchangers 35, in the cooling and heating mixed operation mode in the air-conditioning apparatus 100 illustrated in FIG. 5.

[Pump Rotation Operation Control 1 (Heating Main Side Pump Operation, Cooling Only Operation Mode)]

FIG. 6 is a refrigerant circuit diagram that illustrates the stream of the refrigerant and the stream of the heat medium when the pump 31*a* is inactivated in cooling only operation mode in the air-conditioning apparatus 100. With reference to FIG. 6, pump rotation operation control 1 in cooling only operation mode is described. In FIG. 6, the pipes indicated by the thick lines are the pipes in which the heat-source-side refrigerant circulates. In FIG. 6, the directions in which the heat-source-side refrigerant flow paths are indicated by the solid line arrows, and the directions in which the heat medium flows are indicated by the broken line arrows.

In the case of the pump rotation operation control 1 illustrated in FIG. 6, in the outdoor unit 1, the first refrigerant flow switching device 11 is switched such that the heat-source-side refrigerant discharged from the compressor 10 flows into the heat-source-side heat exchanger 12. That is, when the pump 31*a* on the heating main side is inactivated in cooling only operation mode, the outdoor unit 1 in the air-conditioning apparatus 100 also performs substantially the same operation as the previously described normal cooling only operation mode action.

In the relay unit 2, the pump 31*a* on the heating main side is stopped, the pump 31*b*, which is different from the pump 31*a*, on the cooling main side is driven, the heat medium flow control devices 34*a* to 34*d* are opened, and the heat medium is circulated between the intermediate heat exchanger 25*b* and each of the use-side heat exchangers 35*a* to 35*d*. At that time, because the pump 31*a* is inactive, the heat medium is not circulated between the intermediate heat exchanger 25*a* and each of the use-side heat exchangers 35*a* to 35*d*. Thus it is not necessary to exchange heat between the refrigerant and the heat medium in the intermediate heat exchanger 25*a*, and the second refrigerant flow switching device 28*b* is switched to the cooling side. The second refrigerant flow switching device 28*a* is switched to the heating side. The opening and closing device 27 is opened, and the opening and closing device 29 is closed.

First, the stream of the heat-source-side refrigerant in the refrigerant circuit A is described.

A low-temperature and low-pressure refrigerant is compressed by the compressor 10 into a high-temperature and high-pressure gas refrigerant, and the gas refrigerant is discharged. The high-temperature and high-pressure gas refrigerant discharged from the compressor 10 passes through the first refrigerant flow switching device 11 and then the heat-source-side heat exchanger 12, exchanges heat with the outside air, becomes a high-temperature and high-pressure liquid or two-phase refrigerant, passes through the check valve 13*a*, travels in the refrigerant connection pipe 4*a*, and exits from the outdoor unit 1. The high-temperature and high-pressure liquid or two-phase refrigerant exiting from the outdoor unit 1 runs through the refrigerant pipe 4 and flows into the relay unit 2.

The high-temperature and high-pressure liquid or two-phase refrigerant flowing to the relay unit 2 passes through the opening and closing device 27, is expanded by the expansion device 26*b*, and becomes a low-temperature and low-pressure two-phase refrigerant. At that time, the expansion device 26*a* is closed, and thus the refrigerant does not pass therethrough. The two-phase refrigerant evaporates and gasifies while receiving heat from the heat medium circulating in the heat medium circuit B and becomes a low-temperature gas refrigerant. The gas refrigerant exiting from the intermediate heat exchanger 25*b* passes through the second refrigerant flow switching device 28*b*, exits from the relay unit 2, runs through the refrigerant pipe 4b, passes through the check valve 13c, passes through the first refrigerant flow switching device 11 and the accumulator 19, and is sucked into the compressor 10 again.

At that time, the opening degree of the expansion device 26b is controlled such that the superheat (degree of superheat) obtained as the difference between the value in which the pressure of the heat-source-side refrigerant flowing between the intermediate heat exchanger 25b and the expansion device 26b is converted into a saturated temperature and the temperature on the outlet side of the intermediate heat exchanger 25b is constant. When the temperature at an intermediate location of the intermediate heat exchanger 25b can be measured, the temperature at the intermediate location may be used in place of the saturated temperature obtained by the conversion. In that case, no pressure sensor is needed, and the system can be inexpensive.

Next, the stream of the heat medium in the heat medium circuit B is described.

In cooling only operation mode where the pump 31a is inactive, the heating energy of the heat medium is transmitted to the heat-source-side refrigerant in only the intermediate heat exchanger 25b. The cooled heat medium is pressurized by the pump 31b, exits therefrom, and flows into the use-side heat exchangers 35a to 35d through the second heat medium flow switching devices 33a to 33d. The heat medium receives heat from the indoor air in each of the use-side heat exchangers 35a to 35d, thereby cooling the indoor space 7.

The heat media exit from the use-side heat exchangers 35a to 35d and flow into the heat medium flow control devices 34a to 34d. At that time, the heat media flow into the use-side heat exchangers 35a to 35d at flow rates adjusted to those required to produce the air conditioning load required in the insides of the rooms by the workings of the heat medium flow control devices 34a to 34d. The heat media exiting from the heat medium flow control devices 34a to 34d pass through the first heat medium flow switching devices 32a to 32d, flow into the intermediate heat exchanger 25b, provide the refrigerant side with the amount of heat corresponding to the heat received from the indoor space 7 through the indoor units 3, and are sucked into the pump 31b again.

In the pipe 5 in the use-side heat exchanger 35, the heat medium flows in the direction from the second heat medium flow switching device 33 through the heat medium flow control device 34 toward the first heat medium flow switching device 32. The air conditioning load required in the indoor space 7 can be produced by controlling in which the difference between the temperature detected by the temperature sensor 40b and the temperature of the heat medium exiting from the use-side heat exchanger 35 is kept at a target value.

At that time, because the pump 31a is inactive, the opening degree of each of the first heat medium flow switching device 32 and the second heat medium flow switching device 33 is adjusted toward the intermediate heat exchanger 25b such that the heat medium does not flow into the intermediate heat exchanger 25a and the heat-medium flow path toward the intermediate heat exchanger 25b is provided or the opening degree is controlled so as to correspond to the temperature of the heat medium on the outlet of the intermediate heat exchanger 25b. Originally, the use-side heat exchanger 35 should be controlled using the difference between the temperature on its inlet and that on its outlet. However, because the temperature of the heat medium on the inlet side of the use-side heat exchanger 35 is substantially the same as the temperature detected by the temperature sensor 40b, the use of the temperature sensor 40b can reduce the number of temperature sensors and can result in an inexpensive system configuration.

[Pump Rotation Operation Control 2 (Cooling Main Side Pump Operation, Cooling Only Operation Mode)]

Figure 7:
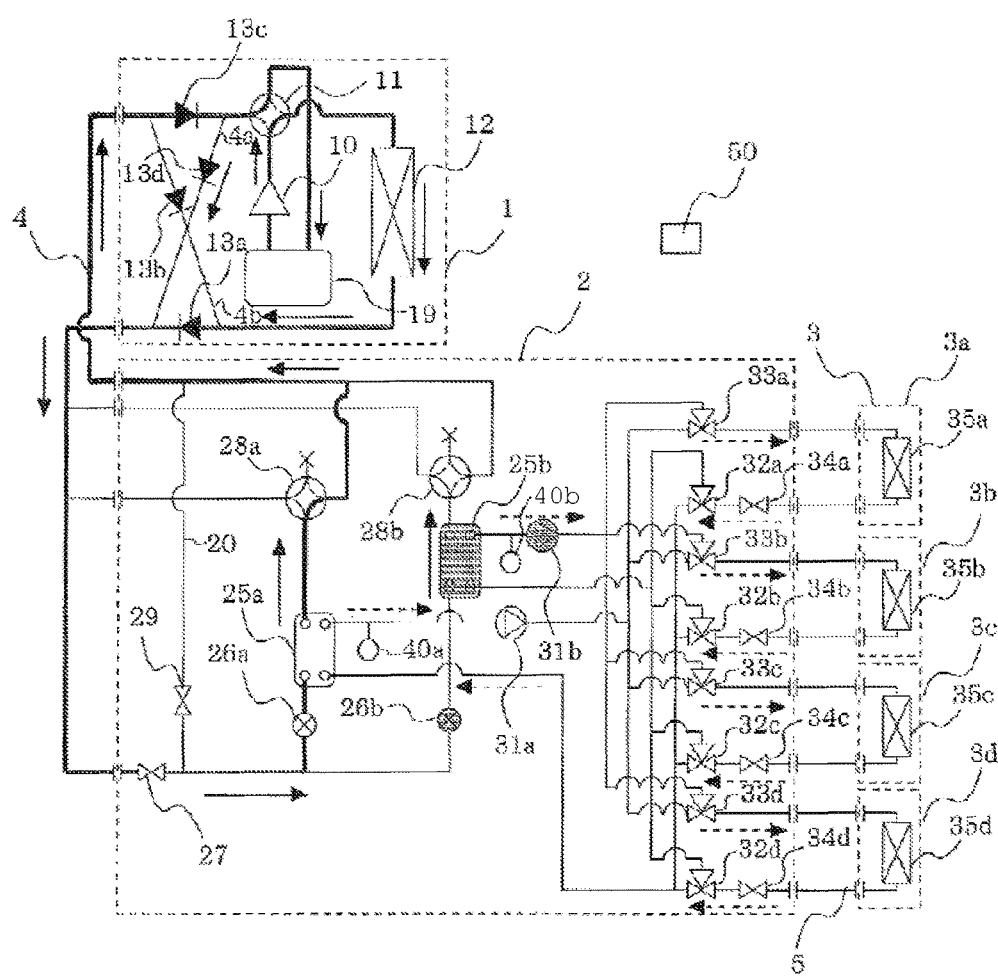
FIG. 7 is a refrigerant circuit diagram that illustrates the stream of the refrigerant and the stream of the heat medium when another pump is inactivated in cooling only operation mode in the air-conditioning apparatus according to Embodiment of the present invention.

FIG. 7 is a refrigerant circuit diagram that illustrates the stream of the refrigerant and the stream of the heat medium when the pump 31b is inactivated in cooling only operation mode in the air-conditioning apparatus 100. With reference to FIG. 7, pump rotation operation control 2 in cooling only operation mode is described. In FIG. 7, the pipes indicated by the thick lines are the pipes in which the heat-source-side refrigerant circulates. In FIG. 7, the directions in which the heat-source-side refrigerant flow paths are indicated by the solid line arrows, and the directions in which the heat medium flows are indicated by the broken line arrows.

In the case of the pump rotation operation control 2 illustrated in FIG. 7, in the outdoor unit 1, the first refrigerant flow switching device 11 is switched such that the heat-source-side refrigerant discharged from the compressor 10 flows into the heat-source-side heat exchanger 12. That is, when the pump 31b on the cooling main side is inactivated in cooling only operation mode, the outdoor unit 1 in the air-conditioning apparatus 100 also performs substantially the same operation as in the previously described normal cooling only operation action.

In the relay unit 2, the pump 31b on the cooling main side is stopped, the pump 31a, which is different from the pump 31b, on the heating operation side is driven, the heat medium flow control devices 34a to 34d are opened, and the heat medium is circulated between the intermediate heat exchanger 25a and each of the use-side heat exchangers 35a to 35d. At that time, because the pump 31b is inactive, the heat medium is not circulated between the intermediate heat exchanger 25b and each of the use-side heat exchangers 35a to 35d. Thus it is not necessary to exchange heat between the refrigerant and the heat medium in the intermediate heat exchanger 25b, and the second refrigerant flow switching device 28b is switched to the heating side. The second refrigerant flow switching device 28a is switched to the cooling side. The opening and closing device 27 is opened, and the opening and closing device 29 is closed.

First, the stream of the heat-source-side refrigerant in the refrigerant circuit A is described.

A low-temperature and low-pressure refrigerant is compressed by the compressor 10 into a high-temperature and high-pressure gas refrigerant, and the gas refrigerant is discharged. The high-temperature and high-pressure gas refrigerant discharged from the compressor 10 passes through the first refrigerant flow switching device 11 and then the heat-source-side heat exchanger 12, exchanges heat with the outside air, becomes a high-temperature and high-pressure liquid or two-phase refrigerant, passes through the check valve 13a, travels in the refrigerant connection pipe 4a, and exits from the outdoor unit 1. The high-temperature and high-pressure liquid or two-phase refrigerant exiting from the outdoor unit 1 runs through the refrigerant pipe 4 and flows into the relay unit 2.

The high-temperature and high-pressure liquid or two-phase refrigerant flowing to the relay unit 2 passes through the opening and closing device 27, is expanded by the expansion device 26a, and becomes a low-temperature and low-pressure two-phase refrigerant. At that time, the expansion device 26b is closed, and thus the refrigerant does not pass therethrough. The two-phase refrigerant evaporates and gasifies while receiving heat from the heat medium circulating in the heat medium circuit B and becomes a low-temperature gas refrigerant. The gas refrigerant exiting from the intermediate heat exchanger 25a passes through the second refrigerant flow switching device 28a, exits from the relay unit 2, runs through the refrigerant pipe 4b, passes through the check valve 13c, passes through the first refrigerant flow switching device 11 and the accumulator 19, and is sucked into the compressor 10 again.

At that time, the opening degree of the expansion device 26a is controlled such that the superheat (degree of superheat) obtained as the difference between the value in which the pressure of the heat-source-side refrigerant flowing between the intermediate heat exchanger 25a and the expansion device 26a is converted into a saturated temperature and the temperature on the outlet side of the intermediate heat exchanger 25a is constant. When the temperature at an intermediate location of the intermediate heat exchanger 25a can be measured, the temperature at the intermediate location may be used in place of the saturated temperature obtained by the conversion. In that case, no pressure sensor is needed, and the system can be inexpensive.

Next, the stream of the heat medium in the heat medium circuit B is described.

In cooling only operation mode where the pump 31b is inactive, the heating energy of the heat medium is transmitted to the heat-source-side refrigerant in only the intermediate heat exchanger 25a, and the cooled heat medium is pressurized by the pump 31a, exits therefrom, and flows into the use-side heat exchangers 35a to 35d through the second heat medium flow switching devices 33a to 33d. The heat medium receives heat from the indoor air in each of the use-side heat exchangers 35a to 35d, thereby cooling the indoor space 7.

The heat media exit from the use-side heat exchangers 35a to 35d and flow into the heat medium flow control devices 34a to 34d. At that time, the heat media flow into the use-side heat exchangers 35a to 35d at flow rates adjusted to those required to produce the air conditioning load required in the insides of the rooms by the workings of the heat medium flow control devices 34a to 34d. The heat media exiting from the heat medium flow control devices 34a to 34d pass through the first heat medium flow switching devices 32a to 32d, flow into the intermediate heat exchanger 25a, provide the refrigerant side with the amount of heat corresponding to the heat received from the indoor space 7 through the indoor units 3, and are sucked into the pump 31a again.

In the pipe 5 in the use-side heat exchanger 35, the heat medium flows in the direction from the second heat medium flow switching device 33 through the heat medium flow control device 34 toward the first heat medium flow switching device 32. The air conditioning load required in the indoor space 7 can be produced by controlling in which the difference between the temperature detected by the temperature sensor 40a and the temperature of the heat medium exiting from the use-side heat exchanger 35 is kept at a target value.

At that time, because the pump 31b is inactive, the opening degree of each of the first heat medium flow switching device 32 and the second heat medium flow switching device 33 is adjusted toward the intermediate heat exchanger 25a such that the heat medium does not flow into the intermediate heat exchanger 25b and the heat-medium flow path toward the intermediate heat exchanger 25a is provided or the opening degree is controlled so as to correspond to the temperature of the heat medium on the outlet of the intermediate heat exchanger 25a. Originally, the use-side heat exchanger 35 should be controlled using the difference between the temperature on its inlet and that on its outlet. However, because the temperature of the heat medium on the inlet side of the use-side heat exchanger 35 is substantially the same as the temperature detected by the temperature sensor 40a, the use of the temperature sensor 40a can reduce the number of temperature sensors and can result in an inexpensive system configuration.

[Pump Rotation Operation Control 3 (Heating Main Side Pump Operation, Heating Only Operation Mode)]

Figure 8:
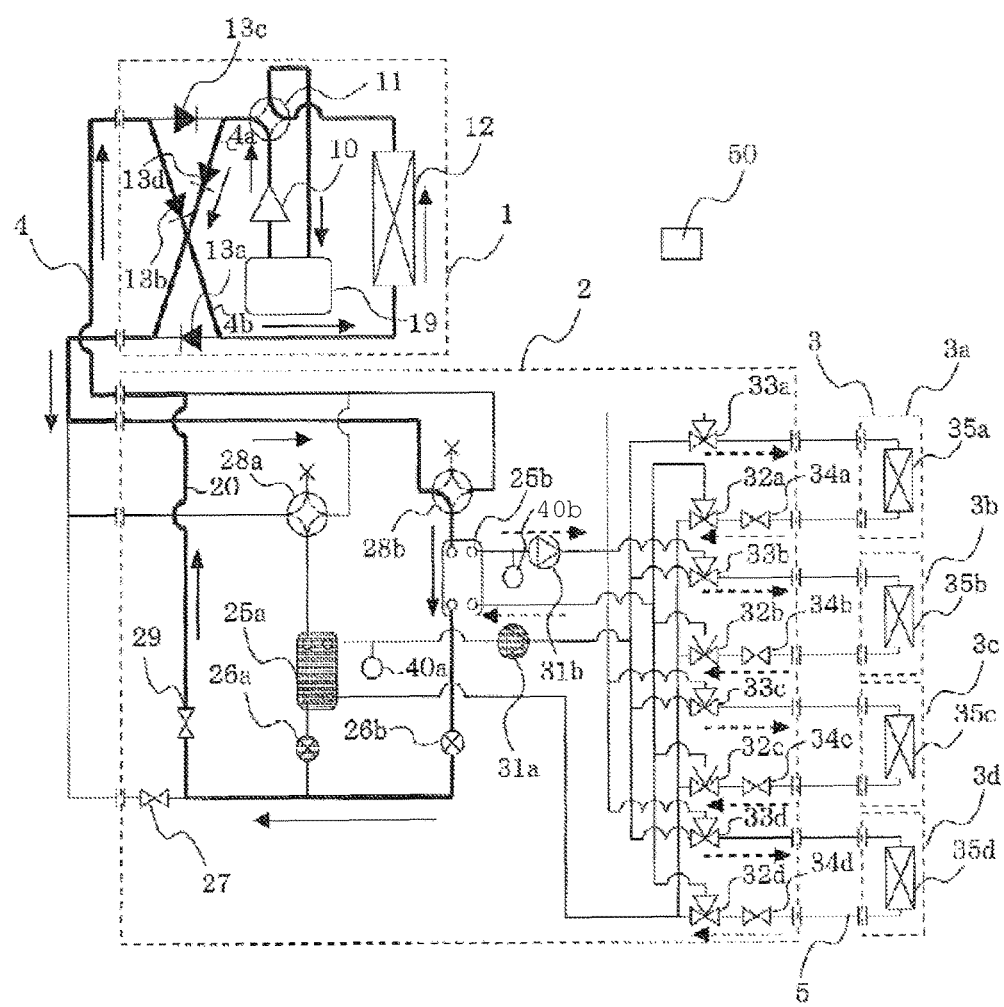
FIG. 8 is a refrigerant circuit diagram that illustrates the stream of the refrigerant and the stream of the heat medium when one pump is inactivated in heating only operation mode in the air-conditioning apparatus according to Embodiment of the present invention.

FIG. 8 is a refrigerant circuit diagram that illustrates the stream of the refrigerant and the stream of the heat medium when the pump 31a is inactivated in heating only operation mode in the air-conditioning apparatus 100. With reference to FIG. 8, pump rotation operation control 3 in heating only operation mode is described. In FIG. 8, the pipes indicated by the thick lines are the pipes in which the heat-source-side refrigerant circulates. In FIG. 8, the directions in which the heat-source-side refrigerant flow paths are indicated by the solid line arrows, and the directions in which the heat medium flows are indicated by the broken line arrows.

In the case of the pump rotation operation control 3 illustrated in FIG. 8, in the outdoor unit 1, the first refrigerant flow switching device 11 is switched such that the heat-source-side refrigerant discharged from the compressor 10 flows into the relay unit 2 without passing through the heat-source-side heat exchanger 12. That is, when the pump 31a on the heating main side is inactivated in heating only operation mode, the outdoor unit 1 in the air-conditioning apparatus 100 also performs substantially the same operation as in the previously described normal heating only operation mode action.

In the relay unit 2, the pump 31a on the heating main side is stopped, the pump 31b, which is different from the pump 31a, on the cooling main side is driven, the heat medium flow control devices 34a to 34d are opened, and the heat medium is circulated between the intermediate heat exchanger 25b and each of the use-side heat exchangers 35a to 35d. At that time, because the pump 31a is inactive, the heat medium is not circulated between the intermediate heat exchanger 25a and each of the use-side heat exchangers 35a to 35d. Thus it is not necessary to exchange heat between the refrigerant and the heat medium in the intermediate heat exchanger 25a, and the second refrigerant flow switching device 28b is switched to the heating side. The second refrigerant flow switching device 28a is switched to the cooling side. The opening and closing device 27 is closed, and the opening and closing device 29 is opened.

First, the stream of the heat-source-side refrigerant in the refrigerant circuit A is described.

A low-temperature and low-pressure refrigerant is compressed by the compressor 10 into a high-temperature and high-pressure gas refrigerant, and the gas refrigerant is discharged. The high-temperature and high-pressure gas refrigerant discharged from the compressor 10 passes through the first refrigerant flow switching device 11, travels in the refrigerant connection pipe 4a, passes through the check valve 13d, and exits from the outdoor unit 1. The high-temperature and high-pressure gas refrigerant exiting from the outdoor unit 1 runs through the refrigerant pipe 4 and flows into the relay unit 2. The high-temperature and high-pressure gas refrigerant flowing to the relay unit 2 passes through the second refrigerant flow switching device 28b and flows into the intermediate heat exchanger 25b. At that time, because the pump 31a is inactive, no heat medium flows into and circulates in the intermediate heat exchanger 25a. Thus the gas refrigerant flowing to the relay unit 2 does not flow into the intermediate heat exchanger 25a and does not exchange heat therein.

The high-temperature and high-pressure gas refrigerant flowing to the intermediate heat exchanger 25b condenses and liquefies while transferring heat to the heat medium circulating in the heat medium circuit B and becomes a high-pressure liquid refrigerant. The liquid refrigerant exiting from the intermediate heat exchanger 25b is expanded by the expansion device 26b and becomes a low-temperature and low-pressure two-phase refrigerant. The two-phase refrigerant passes through the opening and closing device 29, exits from the relay unit 2, runs through the refrigerant pipe 4, and flows into the outdoor unit 1 again. The refrigerant flowing to the outdoor unit 1 travels in the refrigerant connection pipe 4b, passes through the check valve 13b, and flows into the heat-source-side heat exchanger 12 functioning as an evaporator. At that time, the expansion device 26a is closed to prevent the refrigerant from flowing into the intermediate heat exchanger 25a.

The heat-source-side refrigerant flowing to the heat-source-side heat exchanger 12 receives heat from the outside air in the outdoor space 6 in the heat-source-side heat exchanger 12 and becomes a low-temperature and low-pressure gas refrigerant. The low-temperature and low-pressure gas refrigerant exiting from the heat-source-side heat exchanger 12 passes through the first refrigerant flow switching device 11 and the accumulator 19 and is sucked into the compressor 10 again.

At that time, the opening degree of the expansion device 26b is controlled such that the subcool (degree of subcooling) obtained as the difference between the value in which the pressure of the heat-source-side refrigerant flowing between the intermediate heat exchanger 25b and the expansion device 26b is converted into a saturated temperature and the temperature on the outlet side of the intermediate heat exchanger 25 is constant. When the temperature at an intermediate location of the intermediate heat exchanger 25b can be measured, the temperature at the intermediate location may be used in place of the saturated temperature obtained by the conversion. In that case, no pressure sensor is needed, and the system can be inexpensive.

Next, the stream of the heat medium in the heat medium circuit B is described.

In heating main operation mode where the pump 31a is inactive, the heating energy of the heat-source-side refrigerant is transmitted to the heat medium in only the intermediate heat exchanger 25b, and the warmed heat medium is made to flow inside the pipes 5 by the pump 31b. The heat medium is pressurized by the pump 31b, exits therefrom, and flows into the use-side heat exchangers 35a to 35d through the second heat medium flow switching devices 33a to 33d. The heat medium transfers heat to the indoor air in each of the use-side heat exchangers 35a to 35d, thereby heating the indoor space 7.

The heat media exit from the use-side heat exchangers 35a to 35d and flow into the heat medium flow control devices 34a to 34d. At that time, the heat media flow into the use-side heat exchangers 35a to 35d at flow rates adjusted to those required to produce the air conditioning load required in the insides of the rooms by the workings of the heat medium flow control devices 34a to 34d. The heat media exiting from the heat medium flow control devices 34a to 34d pass through the first heat medium flow switching devices 32a to 32d, flow into the intermediate heat exchanger 25b, receive from the refrigerant side the amount of heat corresponding to the heat supplied to the indoor space 7 through the indoor units 3, and are sucked into the pump 31b again.

In the pipe 5 in the use-side heat exchanger 35, the heat medium flows in the direction from the second heat medium flow switching device 33 through the heat medium flow control device 34 toward the first heat medium flow switching device 32. The air conditioning load required in the indoor space 7 can be produced by controlling in which the difference between the temperature detected by the temperature sensor 40b and the temperature of the heat medium exiting from the use-side heat exchanger 35 is kept at a target value.

At that time, each of the first heat medium flow switching device 32 and the second heat medium flow switching device 33 is controlled so as to have an opening degree at which the heat-medium flow path toward the intermediate heat exchanger 25b is provided or an opening degree corresponding to the temperature of the heat medium on the outlet of the intermediate heat exchanger 25b. Originally, the use-side heat exchanger 35 should be controlled using the difference between the temperature on its inlet and that on its outlet. However, because the temperature of the heat medium on the inlet side of the use-side heat exchanger 35 is substantially the same as the temperature detected by the temperature sensor 40b, the use of the temperature sensor 40b can reduce the number of temperature sensors and can result in an inexpensive system configuration.

[Pump Rotation Operation Control 4 (Cooling Main Side Pump Operation, Heating Only Operation Mode)]

Figure 9:
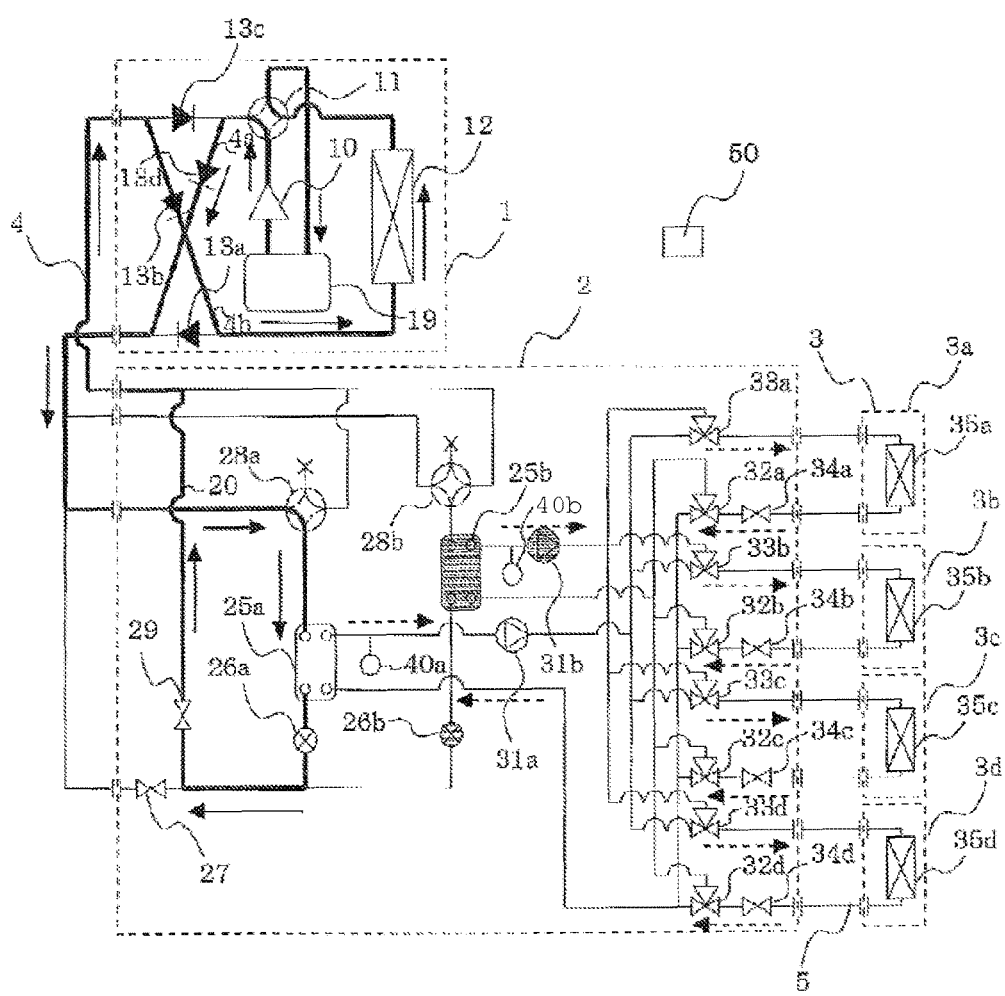
FIG. 9 is a refrigerant circuit diagram that illustrates the stream of the refrigerant and the stream of the heat medium when another pump is inactivated in heating only operation mode in the air-conditioning apparatus according to Embodiment of the present invention.

FIG. 9 is a refrigerant circuit diagram that illustrates the stream of the refrigerant and the stream of the heat medium when the pump 31b is inactivated in heating only operation mode in the air-conditioning apparatus 100. With reference to FIG. 9, pump rotation operation control 4 in heating only operation mode is described. In FIG. 9, the pipes indicated by the thick lines are the pipes in which the heat-source-side refrigerant circulates. In FIG. 9, the directions in which the heat-source-side refrigerant flow paths are indicated by the solid line arrows, and the directions in which the heat medium flows are indicated by the broken line arrows.

In the case of the pump rotation operation control 4 illustrated in FIG. 9, in the outdoor unit 1, the first refrigerant flow switching device 11 is switched such that the heat-source-side refrigerant discharged from the compressor 10 flows into the relay unit 2 without passing through the heat-source-side heat exchanger 12. That is, when the pump 31b on the cooling main side is inactivated in heating only operation mode, the outdoor unit 1 in the air-conditioning apparatus 100 also performs substantially the same operation as in the previously described normal heating only operation mode action.

In the relay unit 2, the pump 31b on the cooling main side is stopped, the pump 31a, which is different from the pump 31b, on the heating main side is driven, the heat medium flow control devices 34a to 34d are opened, and the heat medium is circulated between the intermediate heat exchanger 25a and each of the use-side heat exchangers 35a to 35d. At that time, because the pump 31b is inactive, the heat medium is not circulated between the intermediate heat exchanger 25b and each of the use-side heat exchangers 35a to 35d. Thus it is not necessary to exchange heat between the refrigerant and the heat medium in the intermediate heat exchanger 25b, and the second refrigerant flow switching device 28a is switched to the heating side. The second refrigerant flow switching device 28b is switched to the cooling side. The opening and closing device 27 is closed, and the opening and closing device 29 is opened.

First, the stream of the heat-source-side refrigerant in the refrigerant circuit A is described.

A low-temperature and low-pressure refrigerant is compressed by the compressor 10 into a high-temperature and high-pressure gas refrigerant, and the gas refrigerant is discharged. The high-temperature and high-pressure gas refrigerant discharged from the compressor 10 passes through the first refrigerant flow switching device 11, travels in the refrigerant connection pipe 4a, passes through the check valve 13d, and exits from the outdoor unit 1. The high-temperature and high-pressure gas refrigerant exiting from the outdoor unit 1 runs through the refrigerant pipe 4 and flows into the relay unit 2. The high-temperature and high-pressure gas refrigerant flowing to the relay unit 2 passes through the second refrigerant flow switching device 28a and flows into the intermediate heat exchanger 25a. At that time, because the pump 31b is inactive, no heat medium flows into and circulates in the intermediate heat exchanger 25b. Thus the gas refrigerant flowing to the relay unit 2 does not flow into the intermediate heat exchanger 25b and does not exchange heat therein.

The high-temperature and high-pressure gas refrigerant flowing to the intermediate heat exchanger 25a condenses and liquefies while transferring heat to the heat medium circulating in the heat medium circuit B and becomes a high-pressure liquid refrigerant. The liquid refrigerant exiting from the intermediate heat exchanger 25a is expanded by the expansion device 26a and becomes a low-temperature and low-pressure two-phase refrigerant. The two-phase refrigerant passes through the opening and closing device 29, exits from the relay unit 2, runs through the refrigerant pipe 4, and flows into the outdoor unit 1 again. The refrigerant flowing to the outdoor unit 1 travels in the refrigerant connection pipe 4b, passes through the check valve 13b, and flows into the heat-source-side heat exchanger 12 functioning as an evaporator. At that time, the expansion device 26b is closed to prevent the refrigerant from flowing into the intermediate heat exchanger 25b.

The heat-source-side refrigerant flowing to the heat-source-side heat exchanger 12 receives heat from the outside air in the outdoor space 6 in the heat-source-side heat exchanger 12 and becomes a low-temperature and low-pressure gas refrigerant. The low-temperature and low-pressure gas refrigerant exiting from the heat-source-side heat exchanger 12 passes through the first refrigerant flow switching device 11 and the accumulator 19 and is sucked into the compressor 10 again.

At that time, the opening degree of the expansion device 26a is controlled such that the subcool (degree of subcooling) obtained as the difference between the value in which the pressure of the heat-source-side refrigerant flowing between the intermediate heat exchanger 25a and the expansion device 26a is converted into a saturated temperature and the temperature on the outlet side of the intermediate heat exchanger 25 is constant. When the temperature at an intermediate location of the intermediate heat exchanger 25a can be measured, the temperature at the intermediate location may be used in place of the saturated temperature obtained by the conversion. In that case, no pressure sensor is needed, and the system can be inexpensive.

Next, the stream of the heat medium in the heat medium circuit B is described.

In heating main operation mode where the pump 31b is inactive, the heating energy of the heat-source-side refrigerant is transmitted to the heat medium in only the intermediate heat exchanger 25a, and the warmed heat medium is made to flow inside the pipes 5 by the pump 31a. The heat medium is pressurized by the pump 31a, exits therefrom, and flows into the use-side heat exchangers 35a to 35d through the second heat medium flow switching devices 33a to 33d. The heat medium transfers heat to the indoor air in each of the use-side heat exchangers 35a to 35d, thereby heating the indoor space 7.

The heat media exit from the use-side heat exchangers 35a to 35d and flow into the heat medium flow control devices 34a to 34d. At that time, the heat media flow into the use-side heat exchangers 35a to 35d at flow rates adjusted to those required to produce the air conditioning load required in the insides of the rooms by the workings of the heat medium flow control devices 34a to 34d. The heat media exiting from the heat medium flow control devices 34a to 34d pass through the first heat medium flow switching devices 32a to 32d, flow into the intermediate heat exchanger 25a, receive from the refrigerant side the amount of heat corresponding to the heat supplied to the indoor space 7 through the indoor units 3, and are sucked into the pump 31a again.

In the pipe 5 in the use-side heat exchanger 35, the heat medium flows in the direction from the second heat medium flow switching device 33 through the heat medium flow control device 34 toward the first heat medium flow switching device 32. The air conditioning load required in the indoor space 7 can be produced by controlling in which the difference between the temperature detected by the temperature sensor 40a and the temperature of the heat medium exiting from the use-side heat exchanger 35 is kept at a target value.

At that time, each of the first heat medium flow switching device 32 and the second heat medium flow switching device 33 is controlled so as to have an opening degree at which the heat-medium flow path toward the intermediate heat exchanger 25a is provided or an opening degree corresponding to the temperature of the heat medium on the outlet of the intermediate heat exchanger 25a. Originally, the use-side heat exchanger 35 should be controlled using the difference between the temperature on its inlet and that on its outlet. However, because the temperature of the heat medium on the inlet side of the use-side heat exchanger 35 is substantially the same as the temperature detected by the temperature sensor 40a, the use of the temperature sensor 40a can reduce the number of temperature sensors and can result in an inexpensive system configuration.

As described above, in the air-conditioning apparatus 100, when the cooling load or heating load in the indoor units 3 being connected is small, at least one of the plurality of pumps 31 can be stopped and cooling operation or heating operation can continue in cooling only operation mode and heating only operation mode. In the following description, the indoor units 3 being connected are sometimes referred to as connected indoor units 3.

In the heat medium circuit B, to achieve cooling operation and heating operation, the pipes 5 for connecting the relay unit 2 and the connected indoor units 3 or the pipes used in the relay unit 2 itself or in the connected indoor units 3 themselves may be made of copper. Thus if the pump(s) 31 outputs the heat medium at an excessively high flow rate, the speed of flow of the heat medium flowing in the pipes increases (generally 2 [m/s] or more), and this may cause pitting corrosion in the pipes. In particular, in the air-conditioning apparatus 100, if both the pumps 31a and 31b operate when the operation capacities of the connected indoor units 3 are significantly small, there is a possibility that the heat medium is conveyed at an excessively high flow rate even with the lowest output value in both pumps.

To avoid the occurrence of pitting corrosion arising from the speed of flow of the heat medium, the air-conditioning apparatus 100 implements the operation mode under any one of the pump rotation operation controls 1 to 4 described above with reference to FIGS. 6 to 9.

In addition, the driving power when the operation mode employing one of the plurality of pumps 31 is implemented can be smaller than that when the operation control employing the plurality of pumps 31 is performed.

Figure 10:
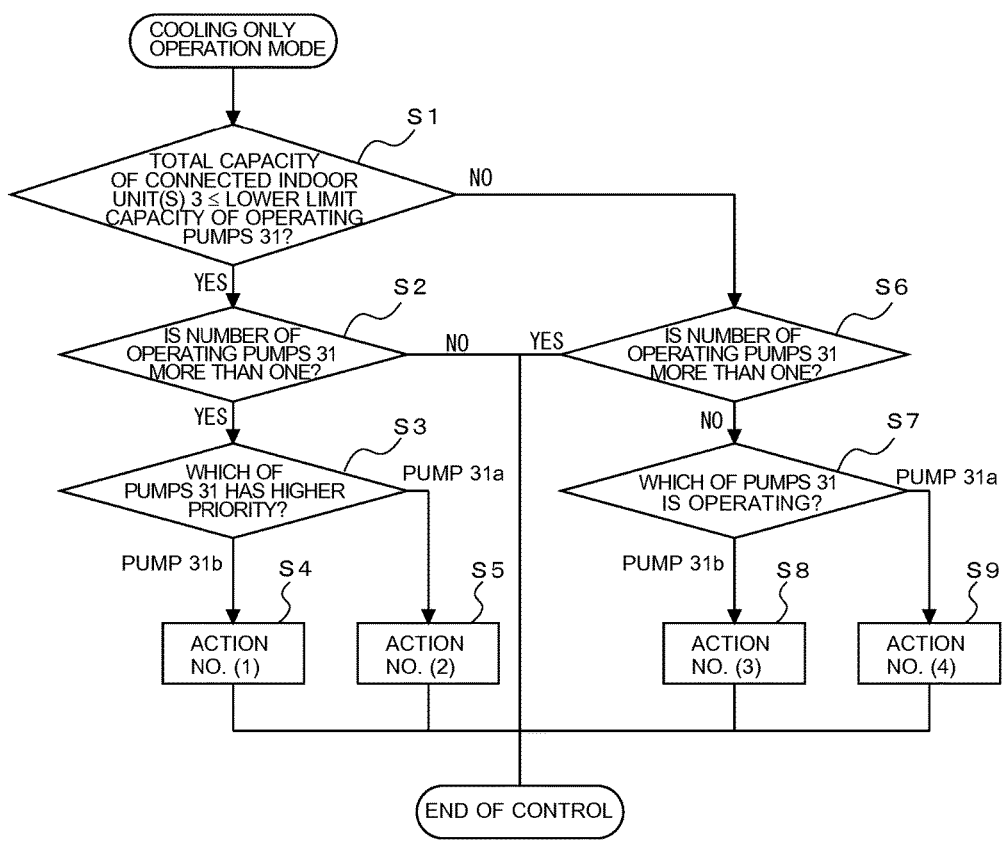
FIG. 10 is a flowchart that illustrates a process for switching the number of operating pumps in pump rotation operation controls 1 and 2 in the air-conditioning apparatus according to Embodiment of the present invention.
Figure 11:
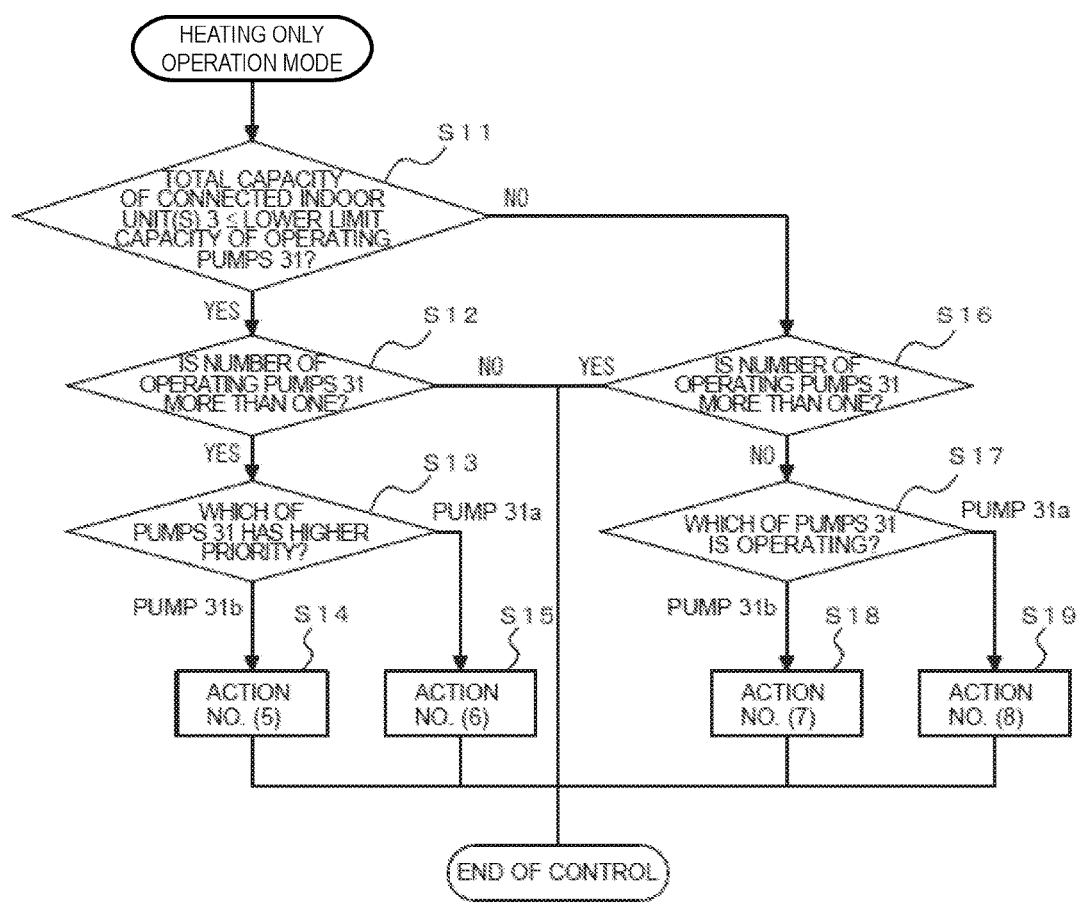
FIG. 11 is a flowchart that illustrates a process for switching the number of operating pumps in pump rotation operation controls 3 and 4 in the air-conditioning apparatus according to Embodiment of the present invention.

Here, a process for switching the number of operating pumps 31 in operation mode under one of the pump rotation operation controls 1 to 4 in the air-conditioning apparatus 100 is described. FIG. 10 is a flowchart that illustrates a process for switching the number of operating pumps 31 in pump rotation operation controls 1 and 2 in the air-conditioning apparatus 100. FIG. 11 is a flowchart that illustrates a process for switching the number of operating pumps 31 in pump rotation operation controls 3 and 4 in the air-conditioning apparatus 100. FIG. 12 is a table that illustrates actions of the refrigerant circuit A and the heat medium circuit B when one of the pumps 31 is inactive in the case where the load in the connected indoor units 3 in each operation mode is small in the air-conditioning apparatus 100. FIG. 13 is a graph that illustrates comparison between changes in driving power when the flow rate decreases using two pumps 31 and changes in driving power when the flow rate decreases using one of the pumps 31 in the case where the load in the connected indoor units is small.

The action timing of the driving components in the refrigerant circuit A and actions of the driving components in the heat medium circuit B relating to the heat-source-side refrigerant flowing into the intermediate heat exchanger 25 in accordance with changes in the number of operating pumps 31 in cooling only operation mode and heating only operation mode are specifically described on the basis of FIGS. 10 to 12. (1) to (8) illustrated in FIG. 12 correspond to (1) to (8) illustrated in FIGS. 10 and 11. In FIG. 13, the horizontal axis indicates a required load in the connected indoor units 3, and the vertical axis indicates the total input value in the pump(s) 31 for the flow rate of the heat medium at which the load is satisfied.

[Switching of Operation of Pumps 31 in Cooling Only Operation Mode]

The process for switching the number of operating pumps 31 in cooling only operation mode is described on the basis of FIGS. 10, 12, and 13. The capacity of the connected indoor unit 3 described below is synonymous with the capacity of the use-side heat exchanger 35 housed in that connected indoor unit 3.

In cooling only operation mode, the controller 50 determines whether the total capacity of connected indoor unit(s) 3 performing cooling operation among the connected indoor units 3 (ratio of the load in connected indoor unit(s) 3 performing cooling operation to that in all the connected indoor units 3) is equal to or lower than the lower limit of the thermal capacity that can be conveyed in the heat medium circuit B (S1). When it is determined that the total capacity of connected indoor unit(s) 3 is equal to or lower than the lower limit of the thermal capacity that can be conveyed in the heat medium circuit B (Yes in S1), the controller 50 reduces the number of operating pumps 31 (Yes in S2 to S5). In contrast, when it is determined that the total capacity of connected indoor unit(s) 3 is higher than the lower limit of the thermal capacity that can be conveyed in the heat medium circuit B (No in S1), the controller 50 increases the number of operating pumps 31 (No in S6 to S9).

In S2, the controller 50 determines whether the number of operating pumps 31 is more than one. When it is determined that the number of operating pumps 31 is more than one (Yes in S2), the controller 50 determines the priorities of the operating pumps 31 to perform the pump rotation operation control 1 or 2 (S3). The priorities of the operating pumps 31 may be set in accordance with the length of the total driving time of each of the pumps 31. In that case, the pump 31 having a longer driving time can be stopped, and the total driving times of all the pumps 31 can be uniformed.

When in S3 it is determined that the pump 31b has a higher priority than the pump 31a (Pump 31b in S3), the controller 50 performs Action No. (1) (S4). In Action No. (1), the state where both the pumps 31a and 31b are operating is changed to the state where the pump 31a is stopped. Before the pump 31a is stopped, the second refrigerant flow switching device 28a is switched to the heating side (Action (1)), and the expansion device 26a is closed (Action (2)). Then, the pump 31a is stopped (Action (3)).

When in S3 it is determined that the pump 31a has a higher priority than the pump 31b (Pump 31a in S3), the controller 50 performs Action No. (2) (S5). In Action No. (2), the state where both the pumps 31a and 31b are operating is changed to the state where the pump 31b is stopped. Before the pump 31b is stopped, the second refrigerant flow switching device 28b is switched to the heating side (Action (1)), and the expansion device 26b is closed (Action (2)). Then, the pump 31b is stopped (Action (3)).

When in S2 it is determined that the number of operating pumps 31 is not more than one (No in S2), the controller 50 ends the pump rotation operation control 1 or 2.

In S6, the controller 50 determines whether the number of operating pumps 31 is more than one. When it is determined that the number of operating pumps 31 is not more than one (No in S6), the controller 50 identifies the operating pump 31 (S7).

When in S7 the pump 31b is identified as the operating pump 31 (Pump 31b in S7), the controller 50 performs Action No. (3) (S8). In Action No. (3), the state where the pump 31a is inactive is changed to the state where both the pumps 31a and 31b are operating. The pumps 31a and 31b are both driven at low speeds (Action (1)), the closing of the expansion device 26a is released (Action (2)), and then the second refrigerant flow switching device 28a is switched to the cooling side (Action (3)).

When in S7 the pump 31a is identified as the operating pump 31 (Pump 31a in S7), the controller 50 performs Action No. (4) (S9). In Action No. (4), the state where the pump 31b is inactive is changed to the state where both the pumps 31a and 31b are operating. The pumps 31a and 31b are both driven at low speeds (Action (1)), the closing of the expansion device 26b is released (Action (2)), and then the second refrigerant flow switching device 28b is switched to the cooling side (Action (3)).

When in S6 the number of operating pumps 31 is not more than one (No in S6), the controller 50 ends the pump rotation operation control 1 or 2.

One example of the ratio at which the number of operating pumps 31 is changed may be 50% or less of the thermal capacity that can be conveyed in the heat medium circuit B. The ratio at which the number of operating pumps 31 is changed depends on the head and the flow rate that each of the pumps 31 for conveying the heat medium can provide and thus is not limited to 50% or less. It is necessary to compare the lowest flow rate that the two pumps 31 can provide and a required indoor load and to carefully determine whether, at that flow rate, the flow speed in the heat medium circuit B involves the risk of pitting corrosion in pipes caused by an excessive flow speed described above.

As illustrated in FIG. 13, when the load in the connected indoor units 3 is small, the total input value of the pumps 31 at the heat-medium flow rate satisfying the required load in the connected indoor units 3 when both the pumps 31a and 31b are driven and that when either one of the pumps 31 is driven are different. Thus, for the ratio at which the number of operating pumps 31 is changed, it is necessary to determine the optimal number of operating pumps 31 corresponding to each indoor load in consideration of the details illustrated in FIG. 13, in addition to the control process illustrated in FIG. 10.

Additionally, in the case of reducing the number of operating pumps 31, it is necessary to selectively stop the pump 31a or 31b. One example case may be the one in which after the total driving times of the pumps 31a and 31b are stored in the controller 50 in the air-conditioning apparatus 100, the total driving times of both the pumps 31a and 31b are uniformed by stopping a pump having a longer total driving time at the timing of reducing the number of operating pumps 31. Other cases are also applicable. It may be useful to set a criterion of switching in accordance with to the operation states of the connected indoor units 3 and the pump specifications of each of the pumps 31a and 31b.

In the case of increasing the number of operating pumps 31, there is a possibility that the flow rate in the heat medium circuit B markedly rises in response to an increase in the number of operating pumps 31 from the state where the pump 31a or 31b is operating. Thus in the case of increasing the number of operating pumps 31, each of both a pump 31 that has been driven and another pump 31 that is to be driven are driven at a lowest stable flow rate at which it can convey the heat medium.

Additionally, in the case of reducing the number of operating pumps 31, the flow rate of the heat medium decreases, and the heat medium is not conveyed to the intermediate heat exchanger 25 connected to the pump 31 being stopped. Thus stopping the heat-source-side refrigerant flowing into that intermediate heat exchanger 25 as well can prevent unnecessary refrigerant from flowing into the intermediate heat exchanger 25 in which no heat is exchanged. In addition, stopping the flowing heat-source-side refrigerant before stopping the heat medium flowing into the intermediate heat exchanger 25 can avoid the risk of freeze of the heat medium inside the intermediate heat exchanger 25 caused by the heat-source-side refrigerant receiving heat therefrom.

In the case of increasing the number of operating pumps 31, causing the heat medium to flow into the connected intermediate heat exchanger 25 by the pump 31 that is made to operate before causing the heat-source-side refrigerant to flow into the intermediate heat exchanger can also avoid the risk of freeze of the heat medium inside the intermediate heat exchanger 25 caused by the heat-source-side refrigerant receiving heat therefrom.

[Switching of Operation of Pumps 31 in Heating Only Operation Mode]

The process for switching the number of operating pumps 31 in heating only operation mode is described on the basis of FIG. 11.

In heating only operation mode, the controller 50 determines whether the total capacity of connected indoor unit(s) 3 performing heating operation among the connected indoor units 3 (ratio of the load in connected indoor unit(s) 3 performing heating operation to that of all the connected indoor units 3) is equal to or lower than the lower limit of the thermal capacity that can be conveyed in the heat medium circuit B (S11). When it is determined that the total capacity of connected indoor unit(s) 3 is equal to or lower than the lower limit of the thermal capacity that can be conveyed in the heat medium circuit B (Yes in S11), the controller 50 reduces the number of operating pumps 31 (Yes in S12 to S15). In contrast, when it is determined that the total capacity of connected indoor unit(s) 3 is higher than the lower limit of the thermal capacity that can be conveyed in the heat medium circuit B (No in S11), the controller 50 increases the number of operating pumps 31 (No in S16 to S19).

In S12, the controller 50 determines whether the number of operating pumps 31 is more than one. When it is determined that the number of operating pumps 31 is more than one (Yes in S12), the controller 50 determines the priorities of the operating pumps 31 to perform the pump rotation operation control 3 or 4 (S13). The priorities of the operating pumps 31 may be set in accordance with the length of the total driving time of each of the pumps 31. In that case, the pump 31 having a longer driving time can be stopped, and the total driving times of all the pumps 31 can be uniformed.

When in S13 it is determined that the pump 31b has a higher priority than the pump 31a (Pump 31b in S13), the controller 50 performs Action No. (5) (S14). In Action No. (5), the state where both the pumps 31a and 31b are operating is changed to the state where the pump 31a is stopped. The expansion device 26a is closed (Action (1)), the pump 31a is stopped (Action (2)), and then the first heat medium flow switching device 32 and the second heat medium flow switching device 33 are switched toward the pump 31b (Action (3)).

When in S13 it is determined that the pump 31a has a higher priority than the pump 31b (Pump 31a in S13), the controller 50 performs Action No. (6) (S15). In Action No. (6), the state where both the pumps 31a and 31b are operating is changed to the state where the pump 31b is stopped. The expansion device 26b is closed (Action (1)), the pump 31b is stopped (Action (2)), and then the first heat medium flow switching device 32 and the second heat medium flow switching device 33 are switched toward the pump 31a (Action (3)).

When in S12 it is determined that the number of operating pumps 31 is not more than one (No in S12), the controller 50 ends the pump rotation operation control 3 or 4.

In S16, the controller 50 determines whether the number of operating pumps 31 is more than one. When it is determined that the number of operating pumps 31 is not more than one (No in S16), the controller 50 identifies the operating pump 31 (S17).

When in S17 the pump 31b is identified as the operating pump 31 (Pump 31b in S17), the controller 50 performs Action No. (7) (S18). In Action No. (7), the state where the pump 31a is inactive is changed to the state where both the pumps 31a and 31b are operating. The first heat medium flow switching device 32 and the second heat medium flow switching device 33 are switched toward both the pumps 31a and 31b (Action (1)), the pumps 31a and 31b are both driven at low speeds (Action (2)), and the closing of the expansion device 26a is released (Action (3)).

When in S17 the pump 31a is identified as the operating pump 31 (Pump 31a in S17), the controller 50 performs Action No. (8) (S19). In Action No. (8), the state where the pump 31b is inactive is changed to the state where both the pumps 31a and 31b are operating. The first heat medium flow switching device 32 and the second heat medium flow switching device 33 are switched toward both the pumps 31a and 31b (Action (1)), the pumps 31a and 31b are both driven at low speeds (Action (2)), and the closing of the expansion device 26b is released (Action (3)).

When in S16 the number of operating pumps 31 is more than one (YES in S16), the controller 50 ends the pump rotation operation control 3 or 4.

One example of the ratio at which the number of operating pumps 31 is changed may be 50% or less of the thermal capacity that can be conveyed in the heat medium circuit B. The ratio at which the number of operating pumps 31 is changed depends on the head and the flow rate that each of the pumps 31 for conveying the heat medium can provide and thus is not limited to 50% or less. It is necessary to compare the lowest flow rate that the two pumps 31 can provide and a required indoor load and to carefully determine whether, at that flow rate, the flow speed in the heat medium circuit B involves the risk of pitting corrosion in pipes caused by an excessive flow speed described above.

As illustrated in FIG. 13, when the load in the connected indoor units 3 is small, the total input value of the pumps 31 at a heat-medium flow rate satisfying the required load in the connected indoor units 3 when both the pumps 31a and 31b are driven and that when either one of the pumps 31 is driven are different. Thus, for the ratio at which the number of operating pumps 31 is changed, it is necessary to determine the optimal number of operating pumps 31 corresponding to each indoor load in consideration of the details illustrated in FIG. 13, in addition to the control process illustrated in FIG. 11.

Additionally, in the case of reducing the number of operating pumps 31, it is necessary to selectively stop the pump 31a or 31b. One example case may be the one in which after the total driving times of the pumps 31a and 31b are stored in the controller 50 in the air-conditioning apparatus 100, the total driving times of both the pumps 31a and 31b are uniformed by stopping a pump having a longer total driving time at the timing of reducing the number of operating pumps 31. Other cases are also applicable. It may be useful to set a criterion of switching in accordance with the operation states of the connected indoor units 3 and the pump specifications of each of the pumps 31a and 31b.

In the case of increasing the number of operating pumps 31, there is a possibility that the flow rate in the heat medium circuit B markedly rises in response to an increase in the number of operating pumps 31 from the state where the pump 31a or 31b is operating. Thus in the case of increasing the number of operating pumps 31, each of both a pump 31 that is being driven and another pump 31 that is to be driven are driven at a lowest stable flow rate at which it can convey the heat medium.

Additionally, in the case of reducing the number of operating pumps 31, the flow rate of the heat medium decreases, and the heat medium is not conveyed to the intermediate heat exchanger 25 connected to the pump 31 being stopped. Thus stopping the heat-source-side refrigerant flowing into that intermediate heat exchanger 25 as well can prevent unnecessary refrigerant from flowing into the intermediate heat exchanger 25 in which no heat is exchanged. In addition, stopping the flowing heat-source-side refrigerant before stopping the heat medium flowing into the intermediate heat exchanger 25 can avoid the risk of breakage of the components of the heat medium circuit arising from an excessive temperature rise of the heat medium inside the intermediate heat exchanger 25 caused by the heat-source-side refrigerant transferring heat thereto.

In the case of increasing the number of operating pumps 31, causing the heat medium to flow into the connected intermediate heat exchanger 25 by the pump 31 that is made to operate before causing the heat-source-side refrigerant to flow into the intermediate heat exchanger can also avoid the risk of breakage of the components of the heat medium circuit arising from an excessive temperature rise of the heat medium inside the intermediate heat exchanger 25 caused by the heat-source-side refrigerant transferring heat thereto.

Each of the first heat medium flow switching device 32 and the second heat medium flow switching device 33 in the air-conditioning apparatus 100 may be any device capable of switching the flow, for example, a device capable of switching a three-way passage, such as a three-way valve, or a combination of two devices each opening and closing a two-way passage, such as opening and closing valves. A device capable of changing a flow rate of a three-way passage, such as a stepping-motor-driven mixing valve, or a combination of two devices each capable of changing a flow rate of a two-way passage, such as electronic expansion valves, may be used as each of the first heat medium flow switching device 32 and the second heat medium flow switching device 33. In that case, water hammer caused by abruptly opening and closing the passage can be prevented. Additionally, in Embodiment, the case where the heat medium flow control device 34 is a two-way valve is described as an example. The heat medium flow control device 34 may be a control valve having a three-way passage and may be disposed with a bypass pipe that bypasses the use-side heat exchanger 35.

The heat medium flow control device 34 may be a stepping-motor-driven device capable of controlling a flow rate of a medium flowing the passage and may also be a two-way valve or a three-way valve in which one port is closed. As the heat medium flow control device 34, a device configured to open and close a two-way passage, such as an opening and closing valve, may be used, and a mean flow rate may be controlled by repeating on and off operations.

The case where the second refrigerant flow switching device 28 is a four-way valve is illustrated as an example. Other cases are also applicable. A plurality of two-way passage switching valves or three-way passage switching valves may also be used, and the refrigerant may be allowed therethrough in substantially the same manner.

The above description can also apply to the case where only one set of the use-side heat exchanger 35 and heat medium flow control device 34 is connected. No problem arises when a plurality of devices working in the same way are disposed as each of the intermediate heat exchanger 25 and expansion device 26. Additionally, although the case where the heat medium flow control device 34 is incorporated in the relay unit 2 is described as an example, other cases are also applicable. The heat medium flow control device 34 may be incorporated in the indoor unit 3 or may also be separated from the relay unit 2 and the indoor unit 3.

Examples of the heat medium may include brine (antifreeze), water, a liquid mixture of brine and water, and a liquid mixture of water and an additive having high anticorrosive properties. Accordingly, in the air-conditioning apparatus 100, even if the heat medium leaks to the indoor space 7 through the indoor unit 3, the use of a material with a high level of safety as the heat medium can contribute to improvement in safety.

In Embodiment, the case where the air-conditioning apparatus 100 includes the accumulator 19 is described as an example. The accumulator 19 is optional. Typically, each of the heat-source-side heat exchanger 12 and the use-side heat exchanger 35 is equipped with the air-sending device, and condensation or evaporation is facilitated by air-sending in many cases. However, other cases are also applicable. For example, a device like a panel heater making use of radiation may also be used as the use-side heat exchanger 35, and a water-cooled type device in which heat is moved by water or antifreeze may also be used as the heat-source-side heat exchanger 12. That is, any type of the device having a structure that can radiate heat or receive heat may be used as the heat-source-side heat exchanger 12 and the use-side heat exchanger 35.

In Embodiment, the case where the four use-side heat exchangers 35 are used is described as an example. That number is not particularly limited. The case where the two intermediate heat exchangers 25a and 25b are used is described as an example. Other cases are also applicable. Any number of intermediate heat exchangers may be disposed as long as they are configured to be able to cool or/and heat the heat medium. The number of pumps 31a and the number of pumps 31b are not limited to one. As each of the pumps 31a and 31b, a plurality of pumps with small capacities connected in parallel may be used.

As described above, the air-conditioning apparatus 100 according to Embodiment can be an air-conditioning apparatus that includes the plurality of pumps 31 and that is capable of conveying the heat medium that has exchanged heat with the heat-source-side refrigerant to the indoor units 3 with minimal power consumption, continuing cooling operation or heating operation, avoiding the risk of pitting corrosion in pipes caused by an increase in flow speed of the heat medium, and improving energy savings and safety by operating one pump 31 without operating another pump 31, in single operation mode, when the load of connected indoor units 3 is sufficiently small.

REFERENCE SIGNS LIST 1 outdoor unit 2 relay unit 3 indoor unit 3a indoor unit 3b indoor unit 3c indoor unit 3d indoor unit 4 refrigerant pipe 4a refrigerant connection pipe 4b refrigerant connection pipe 5 pipe 6 outdoor space 7 indoor space 8 space 9 structure 10 compressor first refrigerant flow switching device 12 heat-source-side heat exchanger 13a check valve 13b check valve 13c check valve 13d check valve accumulator 20 bypass pipe 25 intermediate heat exchanger 25a intermediate heat exchanger 25b intermediate heat exchanger 26 expansion device 26a expansion device 26b expansion device 27 opening and closing device 28 second refrigerant flow switching device 28a second refrigerant flow switching device 28b second refrigerant flow switching device 29 opening and closing device 31 pump 31a pump 31b pump 32 first heat medium flow switching device 32a first heat medium flow switching device 32b first heat medium flow switching device 32c first heat medium flow switching device 32d first heat medium flow switching device 33 second heat medium flow switching device 33a second heat medium flow switching device 33b second heat medium flow switching device 33c second heat medium flow switching device 33d second heat medium flow switching device 34 heat medium flow control device 34a heat medium flow control device 34b heat medium flow control device 34c heat medium flow control device 34d heat medium flow control device 35 use-side heat exchanger 35a use-side heat exchanger 35b use-side heat exchanger 35c use-side heat exchanger 35d use-side heat exchanger 40 temperature sensor 40a temperature sensor 40b temperature sensor 50 controller 100 air-conditioning apparatus A refrigerant circuit B heat medium circuit.

The invention claimed is:

1. An air-conditioning apparatus comprising:
   a refrigerant circuit in which a compressor, a heat-source-side heat exchanger, a plurality of expansion devices, refrigerant flow paths in a plurality of intermediate heat exchangers, and a plurality of refrigerant flow switching devices each configured to switch a refrigerant circulation path are connected by a refrigerant pipe, the refrigerant circuit being configured to allow a heat-source-side refrigerant to circulate therethrough;
   a heat medium circuit in which a plurality of heat-medium conveying devices disposed corresponding to the plurality of intermediate heat exchangers, a plurality of use-side heat exchangers, and heat-medium flow paths in the plurality of intermediate heat exchangers are connected by a heat-medium conveying pipe, the heat medium circuit being configured to allow a heat medium to circulates therethrough; and
   a controller,
   wherein the heat-source-side refrigerant and the heat medium exchange heat with each other in the intermediate heat exchangers,
   wherein the controller is configured to,
      when all of the plurality of heat-medium conveying devices are operating and a heat exchange amount in the use-side heat exchangers is equal to or lower than a lower limit of a thermal capacity that can be conveyed in the heat medium circuit,
         before at least one of the plurality of heat-medium conveying devices is stopped, close the refrigerant flow path in the intermediate heat exchanger connected to the heat-medium conveying device that is to be stopped,
         then stop the at least one of the plurality of heat-medium conveying devices, and
         then a thermal capacity required in at least one of the use-side heat exchangers is conveyed by the rest of the plurality of heat-medium conveying devices which were not stopped and which are operating.

2. The air-conditioning apparatus of claim 1, wherein the controller is further configured to,
   when the heat exchange amount in the use-side heat exchangers exceeds the lower limit of the thermal capacity that can be conveyed in the heat medium circuit,
      restart operation of the stopped heat-medium conveying device, and then open the refrigerant flow path in the intermediate heat exchanger connected to the stopped heat-medium conveying device.

3. The air-conditioning apparatus of claim 1, wherein the air-conditioning apparatus is operative in
   a heating only operation mode in which all of the intermediate heat exchangers serve as condensers,
   a cooling only operation mode in which all of the intermediate heat exchangers serve as evaporators, and
   a cooling and heating mixed operation mode in which at least one of the intermediate heat exchangers serves as condenser and the rest of the intermediate heat exchangers serves as evaporator, and
   the controller is further configured to,
      in the heating only operation mode and the cooling only operation mode, when the heat exchange amount in the use-side heat exchangers is equal to or lower than the lower limit of the thermal capacity that can be conveyed in the heat medium circuit, perform control for stopping at least one of the plurality of heat-medium conveying devices.

4. The air-conditioning apparatus of claim 2, wherein the air-conditioning apparatus is operative in a heating only operation mode in which all of the intermediate heat exchangers serve as condensers, a cooling only operation mode in which all of the intermediate heat exchangers serve as evaporators, and a cooling and heating mixed operation mode in which at least one of the intermediate heat exchangers serves as the condenser and the rest of the intermediate heat exchangers serve as the evaporator, and the controller is further configured to, in the heating only operation mode and the cooling only operation mode, when the heat exchange amount in the use-side heat exchangers exceeds the lower limit of the thermal capacity that can be conveyed in the heat medium circuit, perform control for restarting the stopped heat-medium conveying device.

5. The air-conditioning apparatus of claim 1, wherein the controller is further configured to determine timing of performing control for stopping at least one of the plurality of heat-medium conveying devices by a flow rate of the heat medium that can be supplied by the plurality of heat-medium conveying devices, a maximum flow speed of the heat medium circulating in the heat medium circuit, and a ratio of the heat exchange amount to a total heat exchange amount in the use-side heat exchangers.

6. The air-conditioning apparatus of claim 2, wherein the controller is further configured to determine timing of performing control for restarting the stopped heat-medium conveying device by a flow rate of the heat medium that can be supplied by the plurality of heat-medium conveying devices, a maximum flow speed of the heat medium circulating in the heat medium circuit, and a ratio of the heat exchange amount to a total heat exchange amount in the use-side heat exchangers.

7. The air-conditioning apparatus of claim 1, wherein the refrigerant circulating in the refrigerant circuit comprises any one of a single refrigerant, a near-azeotropic refrigerant mixture, a zeotropic refrigerant mixture, a refrigerant that includes a natural refrigerant and that changes in two phases, and a refrigerant that becomes a supercritical state or a mixture of two or more thereof.

8. The air-conditioning apparatus of claim 1, wherein the heat medium circulating in the heat medium circuit comprises antifreeze, water, a liquid mixture thereof, or a material in which an additive having high anti-corrosive properties is added thereto.

9. The air-conditioning apparatus of claim 1, wherein the controller is further configured to before the at least one of the plurality of heat-medium conveying devices is stopped, prior to closing the refrigerant flow path in the intermediate heat exchanger connected to the heat-medium conveying device that is to be stopped due to stopping the at least one of the plurality of heat-medium conveying devices, determine whether all of the plurality of heat medium conveying devices are operating; and determine whether the heat exchange amount in the use-side heat exchangers is equal to or lower than the lower limit of the thermal capacity that can be conveyed in the heat medium circuit;

wherein the closing of the refrigerant flow path in the intermediate heat exchanger which is connected to the heat-medium conveying device that is to be stopped and the stopping of the at least one of the plurality of heat-medium conveying devices, is performed responsive to determining that both (i) all of the plurality of heat medium conveying devices are operating and (ii) the heat exchange amount in the use-side heat exchangers is equal to or lower than the lower limit of the thermal capacity that can be conveyed in the heat medium circuit.

* * * * *